United States Patent [19]

Hamada et al.

[11] Patent Number: 5,038,884
[45] Date of Patent: Aug. 13, 1991

[54] DOG CLUTCH MECHANISM

[75] Inventors: Tetsurou Hamada; Kazuhiko Shimada; Shoji Tokushima; Makoto Watanabe; Naoya Akama; Masami Takano; Shinji Sakuma; Yoshinobu Ezure, all of Tochigi, Japan

[73] Assignee: Honda Giken Kogyo Kabushiki Kaisha, Tokyo, Japan

[21] Appl. No.: 221,293

[22] Filed: Jul. 19, 1988

Related U.S. Application Data

[63] Continuation-in-part of Ser. No. 212,431, Jun. 28, 1988, Pat. No. 4,977,989.

[30] Foreign Application Priority Data

| Jul. 20, 1987 | [JP] | Japan | 62-110816[U] |
| Jul. 24, 1987 | [JP] | Japan | 62-186446 |
| Aug. 7, 1987 | [JP] | Japan | 62-197873 |
| Oct. 13, 1987 | [JP] | Japan | 62-258063 |
| Jun. 13, 1988 | [JP] | Japan | 63-145360 |
| Jun. 13, 1988 | [JP] | Japan | 63-145361 |
| Jun. 14, 1988 | [JP] | Japan | 63-146126 |

[51] Int. Cl.$^5$ ............................................. B60K 17/34
[52] U.S. Cl. ................................... 180/233; 180/247; 180/248; 192/67 R; 192/108; 192/114 R
[58] Field of Search ............... 180/244, 233, 247, 248, 180/249; 192/108, 67 R, 114 R, 46; 74/665 GA, 711

[56] References Cited

U.S. PATENT DOCUMENTS

| 1,913,046 | 6/1933 | Callan | 192/108 X |
| 2,787,355 | 4/1957 | Dodge | 192/108 X |
| 2,950,797 | 8/1960 | Zieher | 192/108 |
| 2,969,134 | 1/1961 | Wiedmann et al. | 192/108 X |
| 3,861,509 | 1/1975 | Inoue et al. | 192/108 X |
| 4,685,352 | 8/1987 | Ohkubo | 180/248 X |
| 4,792,010 | 12/1988 | Kitao et al. | 180/248 X |

FOREIGN PATENT DOCUMENTS 3505105 9/1985 Fed. Rep. of Germany ...... 180/247

Primary Examiner—Mitchell J. Hill
Attorney, Agent, or Firm—Ladas & Parry

[57] ABSTRACT

A dog clutch mechanism for use as a clutch for switching drive power in a four-wheel-drive vehicle has a case, first and second rotatable shafts rotatably supported coaxially in the case for transmitting a relative torque between front and rear wheels of the vehicle, and a dog clutch comprising a dog piece having first dog teeth and fixedly mounted on the first rotatably shaft and a hub having second dog teeth capable of axially meshing with the first dog teeth and axially slidably mounted on the second rotatable shaft. The dog clutch is selectively engageable for transmitting the relative torque between the first and second rotatable shafts. The first and second dog teeth having respective meshing tapered surfaces for producing thrust forces acting on the hub and tending to move the hub in a direction away from the dog piece when the vehicle is braked while a relative forward torque is being transmitted between the first and second rotatable shafts through the dog clutch.

10 Claims, 19 Drawing Sheets

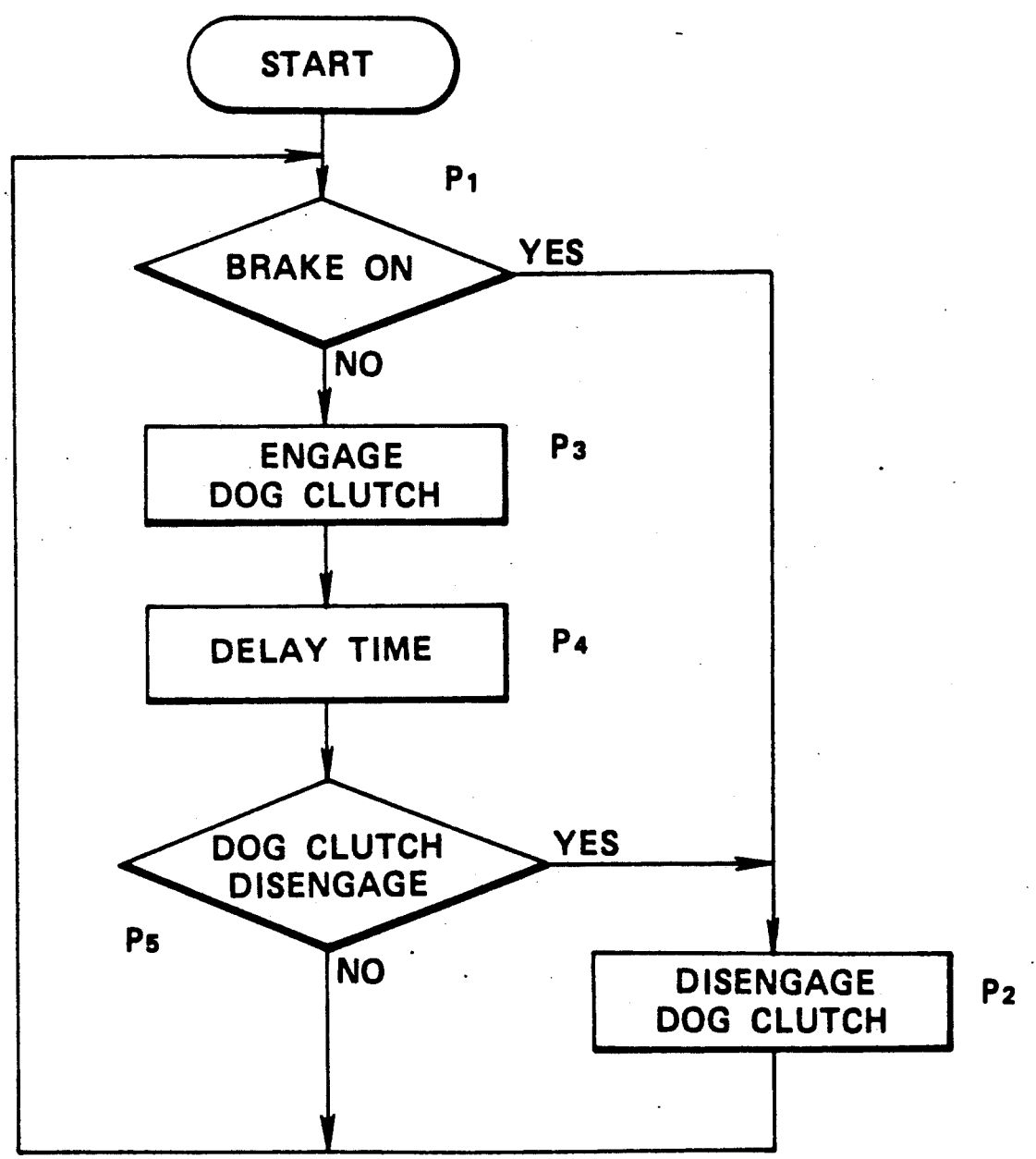

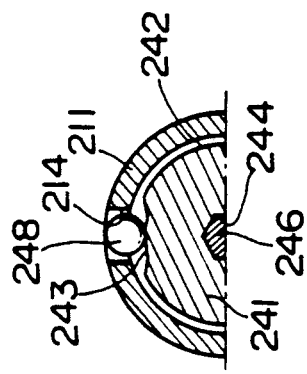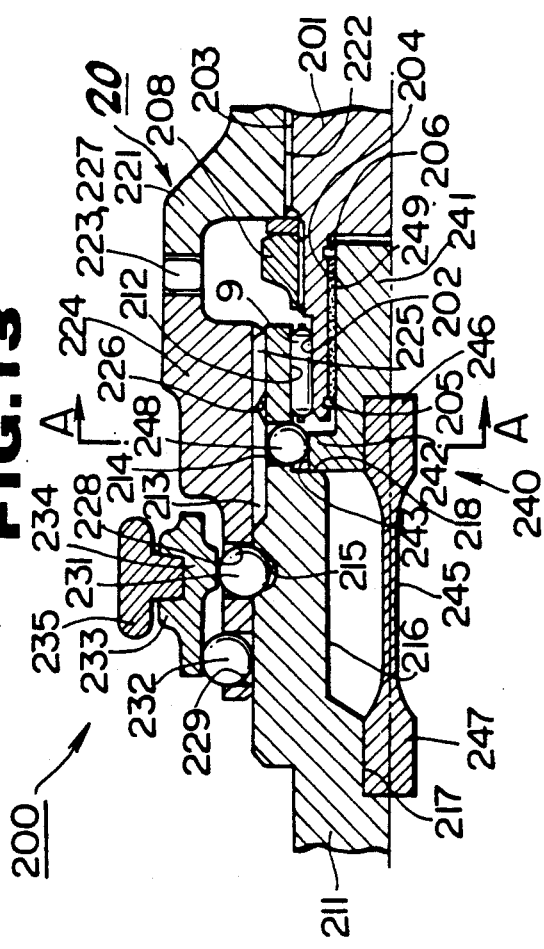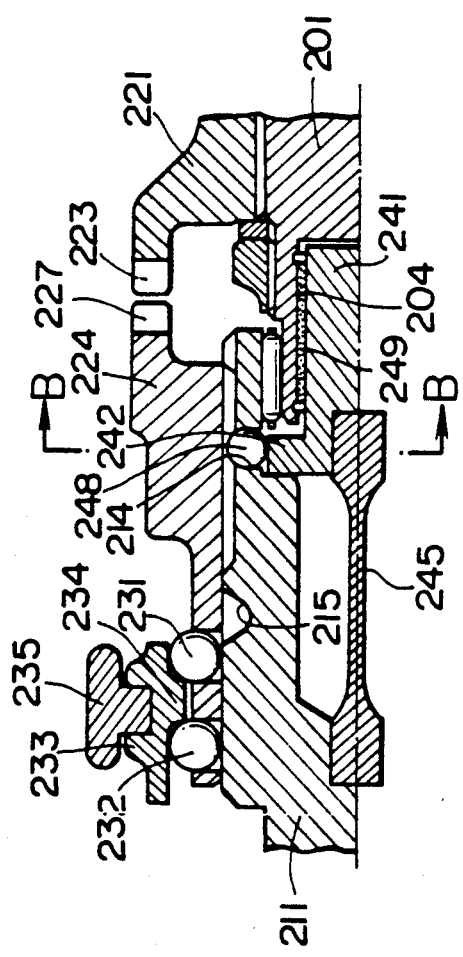

FIG. 20
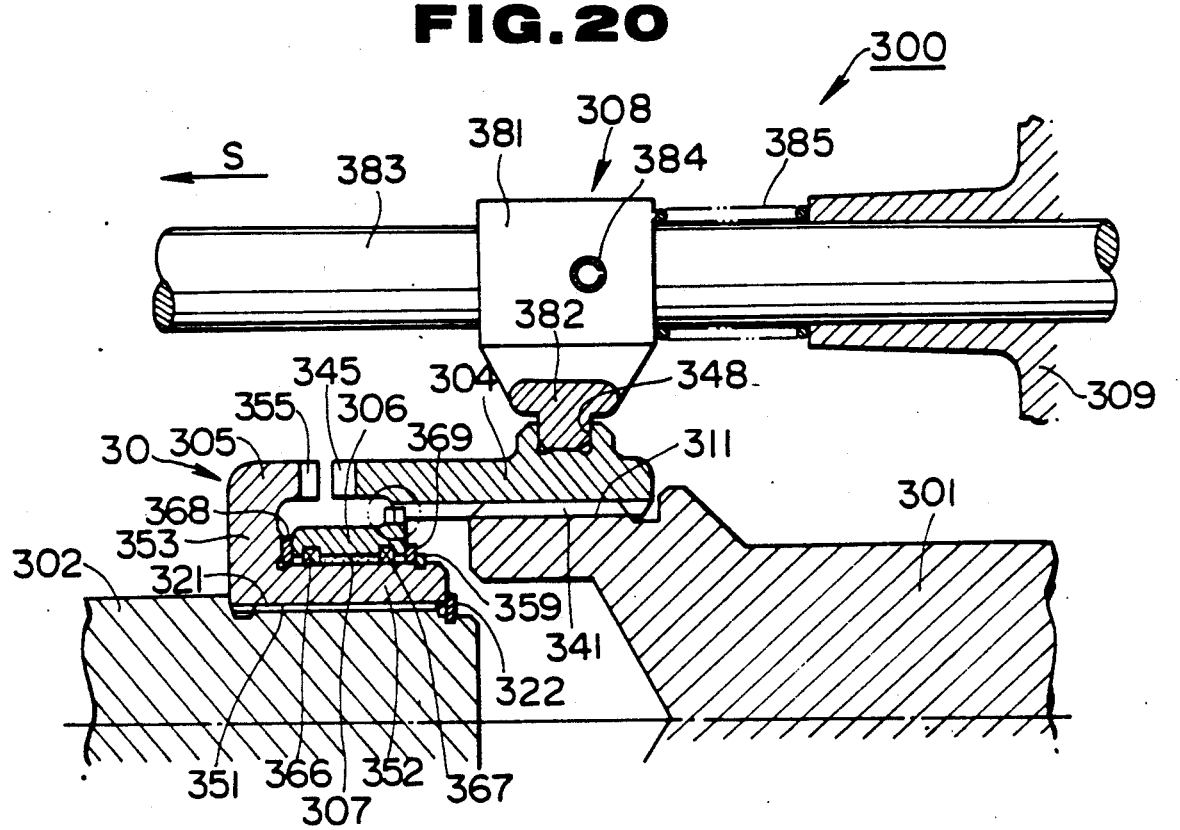
FIG. 21
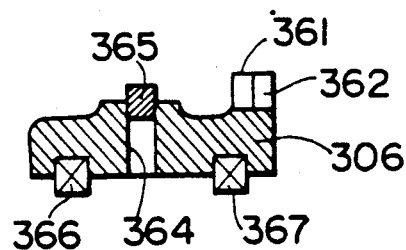
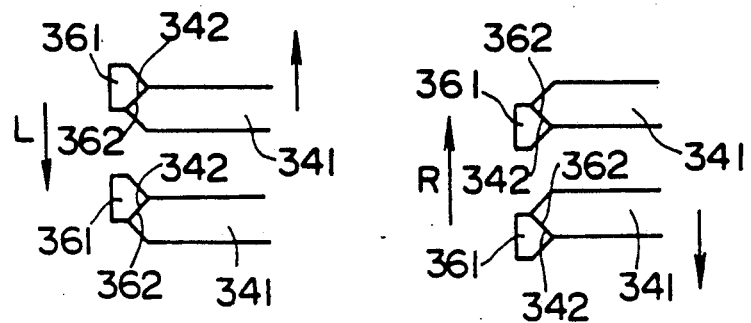
FIG. 22a    FIG. 22b

DOG CLUTCH MECHANISM

CROSS-RELATED APPLICATION

This application is a continuation-in-part of Ser. No. 212,431 filed June 28, 1988 issued as U.S. Pat. No. 4,977,984 on Dec. 18, 1990.

FIELD OF THE INVENTION

The present invention relates to a dog clutch mechanism for selectively connecting and disconnecting input and output shafts which are coaxial with each other for torque transmission therebetween, and more particularly to a dog clutch mechanism for use in drive power switching means on a part-time all-wheel-drive vehicles.

DESCRIPTION OF PRIOR ART

Various all-wheel-drive vehicles have been developed in recent years for higher stability and maneuverability during travel of the vehicles. One type of such all-wheel-drive vehicles is known as a part-time four-wheel-drive vehicle which can switch, as desired, between a two-wheel mode in which front or rear wheels serve as drive wheels under ordinary conditions, e.g., when running on road, and a four-wheel mode in which drive torque is also transmitted to driven wheels under other conditions, e.g., when running off road. All-wheel-drive vehicles of this type have a clutch on a rotatable drive shaft in order to selectively transmit drive torque from a power source via the rotatable drive shaft to the driven wheels.

Japanese Laid-Open Utility Model Publication No. 55-1956 shows an all-wheel-drive vehicle equipped with a clutch mechanism comprising a dog clutch. The dog clutch is selectively engaged and disengaged to switch the vehicle between two-wheel-drive and four-wheel-drive modes.

The dog clutch disclosed in the above publication differs from a friction clutch such as an electromagnetic clutch in that since the dog clutch has meshing teeth for torque transmission, its structure is simple, no slippage whatsoever occurs, and reliable torque transmission is possible.

The dog clutch however has problems in that since the meshing surfaces of the teeth are parallel to the input and output shafts, the dog clutch requires a large operating force for disconnecting the shafts in order to overcome the meshing forces applied to the meshing surfaces, and also in that it produces a shock and noise due to impact engagement of the teeth when connecting the shafts if the difference between the rotational speeds of the shafts is too large. In many applications, a synchronizing mechanism such as a Warner-type synchronizing mechanism is employed to synchronizing the input and output shafts at first to reduce the difference between the rotational speeds thereof to zero, and then the teeth are brought into mesh with each other. However, the Warner-type synchronizing mechanism, in particular, is disadvantageous in that it takes a considerable time before the difference between the rotational speeds of the input and output shafts can be eliminated.

SUMMARY OF THE INVENTION

In view of the foregoing problems of the conventional dog clutch device, it is an object of the present invention to provide a dog clutch mechanism for selectively and smoothly connecting and disconnecting input and output shafts which are disposed coaxially with each other and rotatable relatively to each other.

According to the present invention, there is provided a dog clutch mechanism for switching drive power in a four-wheel-drive vehicle having front and rear wheels, comprising: a case; first and second rotatable shafts rotatably supported coaxially in the case for transmitting a relative torque between the front and rear wheels; and dog clutch means comprising a dog piece having first dog teeth and fixedly mounted on the first rotatable shaft and a hub having second dog teeth capable of axially meshing with the first dog teeth and axially slidably mounted on the second rotatable shaft, the dog clutch means being selectively engageable for transmitting the relative torque between the first and second rotatable shafts, the first and second dog teeth having respective meshing tapered surfaces for producing thrust forces acting on the hub and tending to move the hub in a direction away from the dog piece when the vehicle is braked while a relative forward torque is being transmitted between the first and second rotatable shafts through the dog clutch means.

The dog clutch mechanism further includes clutch engagement checking means for preventing the first and second rotatable shafts from being connected through the dog clutch means when the speed of differential rotation between the first and second rotatable shafts is higher than a predetermined value. The dog clutch mechanism also includes sliding movement limiting means disposed between an outer periphery of the dog piece and the inner peripheral sliding surface of the hub for limiting axial sliding movement of the hub toward the dog piece with a limiting force which increases in proportion to the speed of differential rotation between the dog piece and the hub and for allowing the hub to axially slide when the speed of differential rotation is lower than a predetermined value, when the first and second rotatable shafts are to be connected to each other by the dog clutch means.

The above and further objects, details and advantages of the present invention will become apparent from the following detailed description of preferred embodiments thereof, when read in conjunction with the accompanying drawings.

BRIEF DESCRIPTION OF THE FIGURES OF THE DRAWING

FIG. 12 is a flowchart of a control sequence for engaging the dog clutch of the dog clutch mechanism shown in FIG. 10 which is incorporated in the four-wheel-drive vehicle shown in FIG. 9;

FIG. 13 is a fragmentary longitudinal cross-sectional view of a dog clutch mechanism according to a second embodiment of the present invention;

FIG. 14 is a cross-sectional view taken along line A—A in FIG. 13;

FIG. 15 is a fragmentary longitudinal cross-sectional view showing the dog clutch mechanism of FIG. 13 which is disengaged;

FIG. 16 is a cross-sectional view taken along line B—B in FIG. 15;

FIG. 20 a fragmentary cross-sectional view of a dog clutch mechanism according to a third embodiment of the present invention;

FIG. 21 is a cross-sectional view a blocking member in the dog clutch mechanism of the third embodiment;

FIGS. 22(a) and 22(b) are schematic views showing the manner in which engaged portions of the blocking member and engaging portions of a sleeve are in abutment against each other in the dog clutch mechanism of the third embodiment;

DETAILED DESCRIPTION OF PREFERRED EMBODIMENTS

A dog clutch mechanism 100 according to a first embodiment of the present invention will be described with reference to FIGS. 1 through 9.

Figure 1:
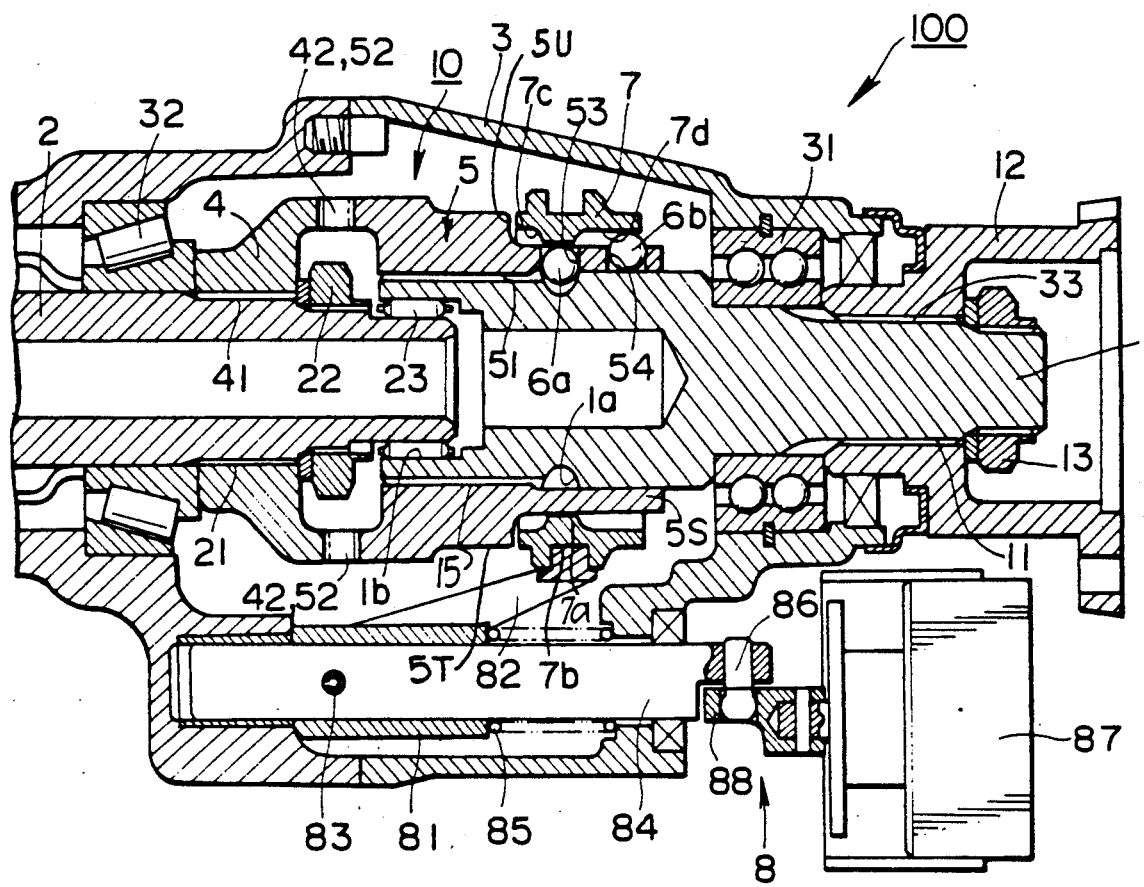
FIG. 1 is a longitudinal cross-sectional view of a dog clutch mechanism according to a first embodiment of the present invention.

FIG. 1 shows in cross section the dog clutch mechanism 100 according to the fifth embodiment. The dog clutch mechanism 100 includes an input shaft 1, an output shaft 2, and a clutch case 3. The input shaft 1 is positioned in a front portion of the clutch case 3 by a bearing 31 and has a front portion over which a flange coupling 12 is fitted through splines 11, 33, the flange coupling 12 being fixed to the input shaft 1 by a nut 13. The output shaft 2 is positioned in a rear portion of the clutch case 3 by a bearing 32 and has a front end relatively rotatably fitted in a circular recess 1b defined in the rear end of the input shaft 1 through a bearing 23.

Figure 9:
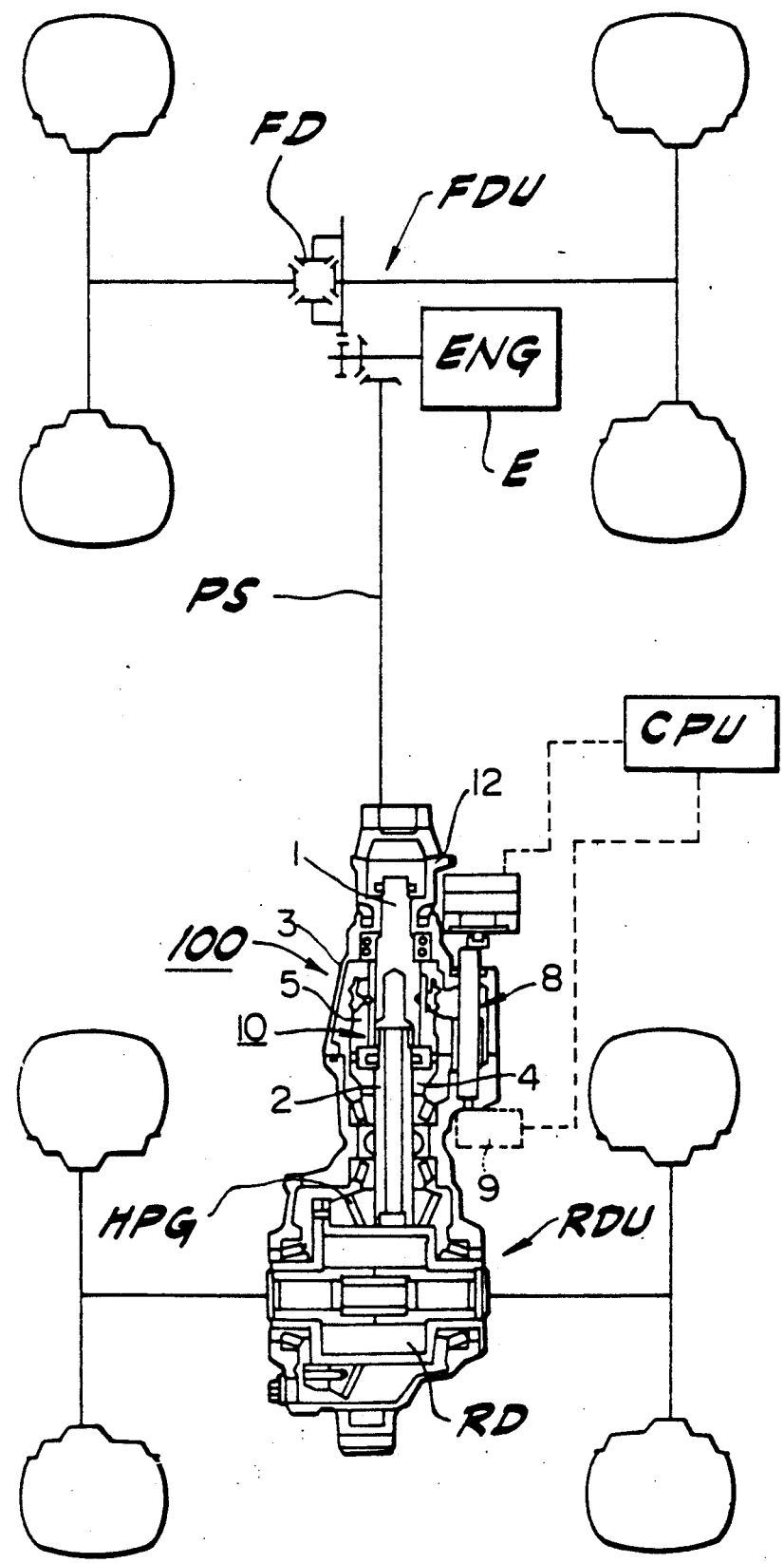
FIG. 9 is a schematic plan view of the drive line system of a four-wheel-drive vehicle in which the dog clutch mechanism of each embodiment of the present invention can be incorporated.

The dog clutch mechanism 100 of the first embodiment is suitable for use in a four-wheel-drive vehicle illustrated in FIG. 9. In FIG. 9, rotative drive output power produced by an engine E is transmitted to a differential FD of a front wheel drive unit FDU and also to a propeller shaft PS which extends rearwardly from the engine E and is coupled to the input shaft 1 by the flange coupling 12. The output shaft 2 is coupled to a differential RD such as a viscous coupling of a rear wheel drive unit RDU. The dog clutch mechanism 100 comprises a dog clutch 10 disposed between the input and output shafts 1, 2 for switching the vehicle between a two-wheel-drive mode and a four-wheel-drive mode.

As illustrated in FIG. 1, the dog clutch 10 comprises a dog piece 4, a hub 5, a plurality of balls 6a, and a tubular engaging member constituted by a sleeve 7. The dog piece 4 is fitted over the front portion of the output shaft 2 through splines 21, 41 in the clutch case 3 and fixed in position by a nut 22. The hub 5 is fitted over the rear portion of the input shaft 1 in the clutch case 3. The hub 5 and the input shaft 1 have respective splines 15, 51 which are engaged so that the hub 5 is axially slidable over, but rotatable with, the input shaft 1.

Figure 2:
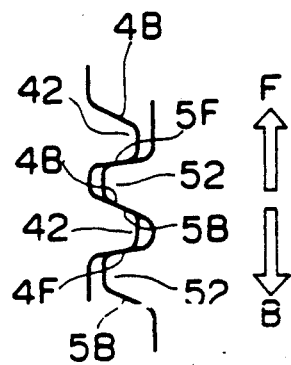
FIG. 2 is a fragmentary developed view showing the manner in which confronting dog teeth of the dog clutch mechanism of the first embodiment mesh with each other.

The dog piece 4 and the hub 5 have a number of dog teeth 42, 52, respectively, projecting axially on respective confronting surfaces thereof and which can mesh with each other. The dog teeth 42, 52 are circumferentially spaced at equal intervals. As shown in FIG. 2, the dog teeth 42, 52 have tapered meshing surfaces 4B, 5B, respectively, inclined at a relatively large angle with respect to the axis of the input and output shafts 1, 2, and tapered meshing surfaces 4F, 5F, respectively inclined at a relatively small angle with respect to the axis of the input and output shafts 1, 2. Assuming that the input and output shafts 1, 2 rotate in the direction of the arrow F when they transmit drive forces to move the vehicle forwardly, the tapered meshing surfaces 4B, 5B do not bear rotative forces or torque, and the tapered meshing surfaces 4F, 5F bear rotative forces or torque for transmission.

The vehicle is equipped with a brake system for applying greater braking forces to the front road wheels than braking forces to the rear road wheels for safety. When such braking forces are applied while the forward drive forces are being transmitted by the tapered meshing surfaces 4F, 5F, decelerating forces in the direction of the arrow B which is opposite to the rotating direction F are first imposed on the input shaft 1, thus bringing the opposite tapered surfaces 4B, 5B into mesh with each other. The meshing engagement of the tapered surfaces 4B, 5B generates thrust forces tending to move the hub 5 in a direction away from the dog piece 4.

The tapered meshing surfaces 4B, 5B will hereinafter be referred to as "decelerating tapered surfaces", whereas the tapered meshing surfaces 4F, 5F as "accelerating tapered surfaces".

The hub 5 has a smaller-diameter front tubular portion 5S slidably disposed over an intermediate portion of the input shaft 1. The front portion 5S has a smaller outside diameter than an adjacent rear tubular portion 5T so that the front and rear tubular portions are connected by a step 5U. The rear tubular portion 5T is connected by splines 15, 51 to the input shaft 1. The smaller-diameter portion 5S has, for example, three guide holes 53 defined in a rear region thereof in circumferentially equally spaced relation and extending radially toward the input shaft 1. The smaller-diameter portion 5S also has similar guide holes 54 defined in a front region thereof. Balls 6a, 6b are rotatably disposed in the guide holes 53, 54, respectively. The input shaft 1 has an annular groove 1a defined in an outer peripheral surface of the intermediate portion thereof adjacent to the front ends of the splines 15. The rear balls 6a can be pushed partly into the annular groove 1a.

The sleeve 7 is axially slidably disposed over the smaller-diameter portion 5S of the hub 5. The sleeve 7 has an annular inner land 7a disposed on an intermediate inner peripheral surface thereof near the rear end thereof and projects radially inwardly to push the rear balls 6a accommodated in the guide holes 53 into the annular groove 1a of the input shaft 1, the annular inner land 7a being slidable on the outer peripheral surface of the smaller-diameter portion 5S. The sleeve 7 has a front inner peripheral surface 7d serving as a guide surface for slidingly guiding the front balls 6b which are accommodated in the guide holes 54 and roll on the outer peripheral surface of the intermediate portion of the input shaft 1. The sleeve 7 also has a rear inner peripheral surface 7c serving as a guide surface for slidingly guiding the rear balls 6a when the sleeve 8 is moved forwardly (to the right in FIG. 1).

In the above construction, the output shaft 2 serves as a first rotatable shaft and the input shaft as a second rotatable shaft, the dog teeth 42 on the dog piece 4 constituting first dog teeth for meshing with second dog teeth 52 on hub 5. The larger diameter portion 5T of hub 5 serves as a first tubular portion which is connected by splines 15, 51 with shaft 1 and the smaller diameter portion 5S serves as a second tubular portion slidably disposed on shaft 1.

An actuator device 8 for actuating the dog clutch 10 is mounted on the clutch case 3. The actuator device 8 comprises a shift fork 81 having two fork arms 82 engaging in an annular groove 7b defined in the outer periphery of the sleeve 7, the shift fork 81 being coupled to a shift rod 84 by means of a spring pin 83. The shift rod 84 is axially slidably disposed in the clutch case 3 parallel to the coaxial input and output shafts 1, 2. A return spring 85 is disposed around the shift rod 84 under compression between the shift fork 81 and a front wall of the clutch case 3 for normally urging the shift fork 81 in a direction to engage the dog clutch 10. The shift rod 84 has a front end projecting out of the clutch case 3 and coupled to a movable member or plunger 88 of a solenoid 87 by means of a coupling pin 86.

When the solenoid unit 87 is energized in unison with the brake system under the control of a control unit CPU shown in FIG. 9, the movable member 88 is moved under magnetic forces to displace the shift rod 84 through the pin 86 from the illustrated position (FIG. 1) axially in the forward direction by a certain distance against the bias of the return spring 85. The sleeve 7 is therefore moved axially in the forward direction from the illustrated position by the same distance by the shift fork 81. When the solenoid unit 87 is de-energized, the actuator device 8 and the sleeve 7 return to the illustrated position under the resiliency of the return spring 85.

In operation, while the torque is being transmitted from the input shaft 1 to the output shaft 2 through the engaged dog clutch 10 as shown, particularly while the forward drive forces are being transmitted through meshing engagement of the accelerating tapered surfaces 4F, 5F as shown in FIG. 2, the brake is applied and at the same time the solenoid 87 is energized to move the sleeve 7 forwardly through the shift rod 84 and the shift fork 81 against the resiliency of the return spring 85, the land 7a of the sleeve 7 is shifted to release the rear balls 6a from the groove 1a of the input shaft 1.

Since the stronger braking forces are applied to the front road wheels than to the rear road wheels for safety as described above, the input shaft 1 is subjected to decelerating forces in the direction B opposite to the direction F, whereupon the decelerating tapered surfaces 4B, 5B engage each other thereby producing thrust forces acting on the hub 5 which is axially slidable. Under the applied thrust forces, the balls 6a are pushed out of the groove 1a toward the guide surface 7c of the sleeve 7, and the hub 5 is moved forwardly on the input shaft 1, thereby bringing the dog teeth 42, 52 out of mesh with each other.

By de-energizing the solenoid unit 87 under the control of the control unit CPU, the actuator device 8 and the sleeve 7 return to the illustrated position under the bias of the return spring 85 to engage the dog clutch 10. More specifically, the sleeve 7 is shifted axially rearwardly through the shift fork 81 under the bias of the return spring 85, and the hub 5 is also shifted axially rearwardly by the balls 6a held against the rear surface of the land 7a to bring the dog teeth 42, 52 into mesh with each other.

When the dog clutch mechanism 100 of the present embodiment is incorporated in the four-wheel-drive vehicle shown in FIG. 9, when the brake is applied while the forward drive torque is being transmitted between the input and output shafts 1, 2 through the dog clutch 10, the transmitted forward drive torque is varied, i.e., decelerating forces are applied to the input shaft 1 coupled to the front drive unit FDU. Thus, the decelerating tapered surfaces 4B, 5B of the dog teeth 42, 52 are caused to mesh with each other, and the hub 5 is subjected to thrust forces in an axial direction away from the dog piece 4. The thrust forces tend to disengage the dog clutch 10 to progressively separate the dog teeth 42, 52 out of mesh with each other. By utilizing the thrust forces thus produced, the torque transmission from the input shaft 1 to the output shaft 2 can be cut off simply by applying a force sufficient to move the sleeve 7 which controls the movement of the balls 6a.

In the case where the four-wheel-drive vehicle shown in FIG. 9 is combined with a four-wheel antilock brake system, torque transmission to the rear wheel drive unit RDU can be cut off with a small operating force in response to operation of the four-wheel antilock brake system. Consequently, the four-wheel antilock brake system can operated to effectively brake the front and rear wheels. Where the four-wheel-drive vehicle incorporates an ordinary brake system, the dog clutch mechanism is effective in maintaining stability of the vehicle in its behavior.

The above embodiment may be modified by mounting the dog piece 4 on the input shaft 1 and mounting the hub 5 on the output shaft 2.

The fact that the dog clutch 10 can switch between the engaged and disengaged positions with a small operating force even while the torque is being transmitted from the input shaft 1 to the output shaft 2 will be theoretically analyzed by using equations.

Figure 3:
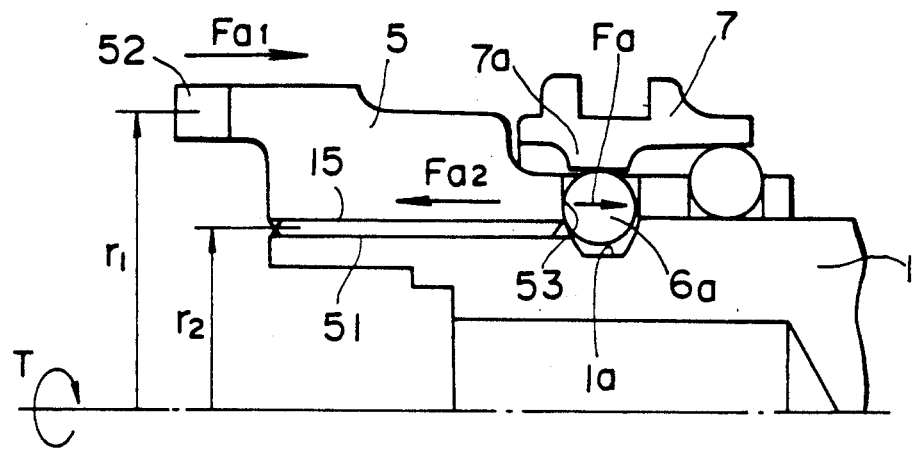
FIG. 3 is a fragmentary schematic diagram illustrating a portion of the dog clutch mechanism of the first embodiment for a theoretical analysis of dynamic characteristics of the dog clutch mechanism based on the generation of thrust forces.

In FIG. 3, $Fa_1$ represents a thrust force produced by meshing engagement of the dog teeth 42, 52, $Fa_2$ an axial frictional resistance generated by engagement of the splines 15, 51 of the input shaft 1 and the hub 5, Fa a force with which the hub 5 pushes the balls 6, T a transmitted torque, $r_1$ the radius of a circle along which the dog teeth 42, 52 rotate, and $r_2$ the radius of a circle along which the splines 15, 51 rotate. The following equation is now established:

$$Fa = Fa_1 - Fa_2$$

Figure 4:
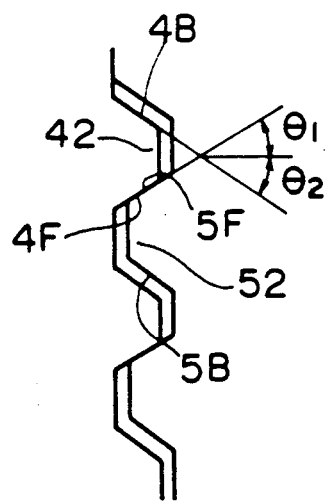
FIG. 4 is a schematic view showing meshing dog teeth of the dog clutch mechanism of the first embodiment where meshing surfaces thereof are tapered at equal angles on accelerating and decelerating sides.
Figure 5:
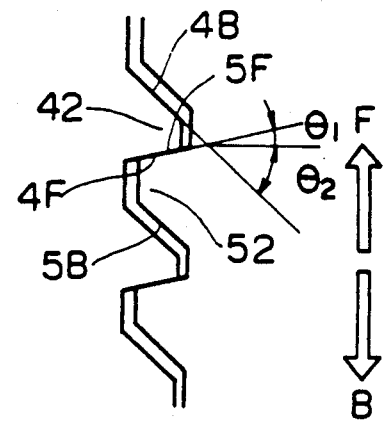
FIG. 5 is a schematic view showing meshing dog surfaces of the dog clutch mechanism of the first embodiment where meshing surfaces thereof are tapered at a larger angle on a decelerating side than on an accelerating side.

It is possible to equalize the angles $\theta_1$, $\theta_2$, of taper of the accelerating tapered surfaces 4F, 5F and the decelerating tapered surfaces 4B, 5B ($\theta_1 = \theta_2$) as shown in FIG. 4 so that $$Fa > 0$$

on both the accelerating and decelerating sides. According to the first embodiment, however, the angle $\theta_1$ of taper of the accelerating tapered surfaces 4F, 5F is selected to be smaller than the angle $\theta_2$ of taper of the decelerating tapered surfaces 4B, 5B as shown in FIG. 5 so that $$Fa < 0.$$

More specifically, assuming that $\mu_1$ is the coefficient of friction of the tooth surfaces of the dog teeth 42, 52, the thrust force $Fa_1$ is expressed as follows:

$$Fa_1 = \frac{T}{r_1} \tan\theta - \mu_1 \cdot \frac{T}{r_1}$$

It is assumed that $\alpha$ represents the pressure angle of the splines 15, 51 and $\mu_2$ the coefficient of friction of the meshing surfaces of the splines 15, 51. The frictional resistance $Fa_2$ is given as follows:

$$Fa_2 = \frac{T}{r_2} \cdot \frac{\mu_2}{\cos\alpha}$$

Since $Fa < 0$ in the transmission of power in the accelerating direction F, $$Fa = Fa_1 - Fa_2 < 0$$

$$Fa_1 < Fa_2$$

$$\frac{T}{r_1} \cdot \tan\theta_1 - \mu_1 \cdot \frac{T}{r_2} < \frac{T}{r_2} < \cdot \frac{\mu_2}{\cos\alpha}$$

Hence, $\theta_1$ should be selected to meet the following inequality:

$$\theta_1 < \tan^{-1}\frac{r_1}{r_2}\left(\frac{\mu_2}{\cos\alpha} + \mu_1\right)$$

Increasing the allowable speed of differential rotation at which the dog teeth of the dog clutch 10 can mesh with each other will be described below.

Figure 6:
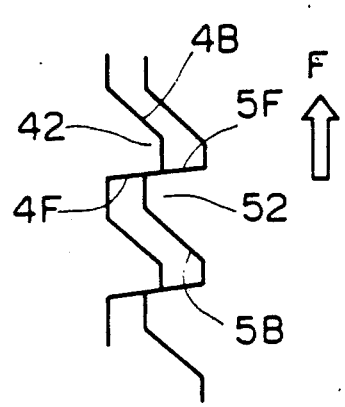
FIG. 6 is a schematic view illustrating the manner in which dog teeth are partly in mesh with each other.

When transmitting power in the accelerating direction F, since $Fa < 0$ according to the structure of the dog clutch 10 of the present embodiment, the hub 5 can be kept in the condition of FIG. 6 even if the accelerating tapered surfaces 4F, 5F are not fully in mesh with each other as shown in FIG. 6, i.e., the balls 6a do not fully enter the groove 1a of the input shaft 1.

Figure 7:
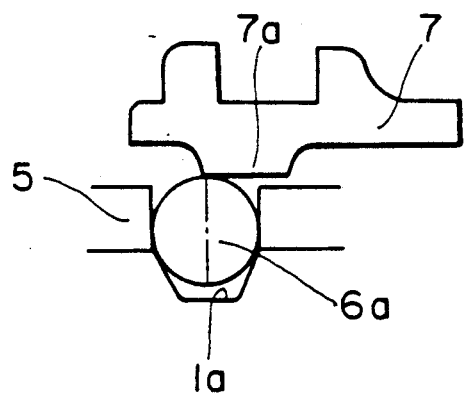
FIG. 7 is a schematic view showing the positional relationship between a ball and a sleeve when the dog teeth are partly in mesh with each other as shown in FIG. 6.

Under the condition of $Fa > 0$, however, the balls 6a would fully enter the groove 1a as shown in FIG. 7, and the dog teeth 42, 52 would mesh with each other incompletely unless the land 7a rides over the balls 6 beyond their center. As a result, the hub 5 would be retracted under the thrust force Fa, and the dog teeth 42, 52 would be released out of mesh with each other, making it impossible to transmit the torque. Where the differential rotation between the hub 5 and the dog piece 4 is large, since the relative speed of the hub 5 and the dog piece 4 is high, the above operation would continuously occur with noise.

With Fa<0 according to the present embodiment, the differential rotation of the hub 5 and the dog piece 4 is eliminated when the dog teeth are not fully in mesh as shown in FIG. 6, and when the transmitted torque is lowered, the balls 6a fully enter the groove 1a, and the land 7a rides over the balls 6 beyond their center, whereupon the shifting of the land is completed.

By thus selecting the angles of the tapered surfaces of the dog teeth so that Fa<0 is met rather than Fa>0, the stroke of the sleeve 7 for allowing the dog teeth to mesh with each other can be reduced, and the allowable speed of differential rotation can be increased.

The reduction of the stroke of the sleeve 7 can be achieved by reducing the diameter of the balls 6a.

More specifically, if Fa>0, the transmitted torque T would be increased to increase the value of Fa, i.e., the load on the balls 6a. According to the present embodiment, since Fa<0 in the accelerating direction F, no load is applied to the balls 6a. Therefore, the load is imposed on the balls 6a only when the torque is transmitted in the decelerating direction B. Inasmuch as the decelerating torque is smaller than the accelerating torque, limitations on the mechanical strength of the balls 6a are reduced, and hence the diameter of the balls 6a can be reduced.

Figure 8:
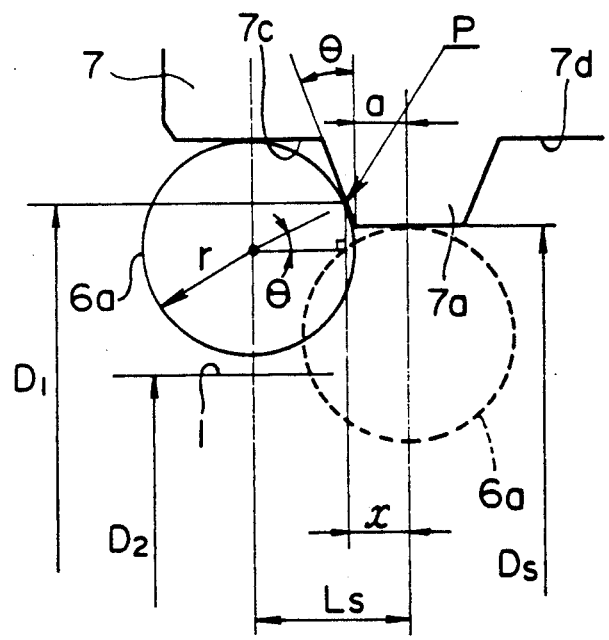
FIG. 8 is a schematic view explaining a theoretical analysis of a reduction in the stroke of the sleeve due to a reduction in the diameter of the ball in the dog clutch mechanism of the first embodiment.

The reduction in the stroke of the sleeve 7 due to the reduced diameter of the balls 6a will hereinafter be proved using theoretical equations:

In FIG. 8, Ds represents the diameter of the land 7a at its inner surface, $D_1$ the diameter at a point P where the ball 6a contacts the side of the land 7a, x the axial distance from the center of the ball 6a as indicated by the broken line in the 4WD mode to the point P, $D_2$ the diameter of the input shaft 1, a the axial distance from the center of the ball 6a in the 4WD mode to the terminal end of the land 7a, r the radius of the ball 6a, and $\theta$ the angle of inclination of the side of the land 7a.

When the relative position of the ball 6a and the sleeve 7 is shifted from the broken line position to the solid line position, the hub 5 is made axially slidable. At this time, the ball 6a contacts the side of the land 7a at the point P. The stroke Ls of the sleeve 7 when such a condition is reached is determined as follows:

$$D_1 = D_2 + 2r + 2r\sin\theta \quad (1)$$
$$= D_2 + 2r(1 + \sin\theta)$$

$$x = a + \frac{D_1 + Ds}{2} \tan\theta \quad (2)$$

*Since Ls=x+rcosθ, equation (2) can be written as:

$$Ls = a + \frac{D_1 + Ds}{2} \tan\theta + r\cos\theta$$

The equation (1) is also put into the latter equation to obtain:

$$Ls = a + \{D_2 + 2r(1 + \sin\theta) + Ds\} \times \frac{\tan\theta}{2} + r\cos\theta$$

Therefore, Ls is reduced by reducing r.

When the dog clutch mechanism 100 of the first embodiment is incorporated in the four-wheel-drive vehicle as described above, while transmitting the forward drive power, the side surfaces of the dog teeth of the dog piece 4 and the hub 5 which are opposite to the rotation transmitting sides which bear the transmitted power are the tapered surfaces 4B, 5B. When the transmitted forward drive power is varied, particularly when the vehicle is braked, decelerating forces acting on the propeller shaft PS cause the tapered surfaces 4B, 5B to engage with each other, thus applying thrust forces to the hub 5 which then tends to move away from the dog piece 4. Thus, since the hub 5 can be moved by utilizing the thrust forces generated between the tapered surfaces of the dog teeth when the brake is applied, the dog clutch 10 can easily be disengaged with low operating forces.

The selection of the angles of the tapered surfaces of the dog teeth, among other various features of the dog clutch mechanism according to the first embodiment of the invention, is applicable to all dog clutch mechanisms of the other embodiments of the invention which will be described below. The invention is also applicable to dog clutch mechanisms which have dog teeth with equal taper angles ($\theta_1 = \theta_2$) to achieve Fa>0 on both the accelerating and decelerating sides. In the following embodiments, dog teeth with $\theta_1 = \theta_2$ and Fa>0 are employed unless specified otherwise.

In the aforesaid first embodiment, in order to avoid engagement or disengagement of the dog teeth 42, 52 with noise when the differential rotation between the hub 5 and the dog piece 4 is large, the angle $\theta_1$ of taper of the accelerating tapered surfaces 4F, 5F of the dog teeth 42, 52 is selected to be smaller than the angle $\theta_2$ of taper of the decelerating tapered surfaces 4B, 5B and Fa<0 for reducing the generation of thrust forces. The present invention is not limited to the arrangement of the first embodiment, however. As shown in FIGS. 11(a) through 11(c), the angle $\theta_1$ of taper of the accelerating tapered surfaces 4F, 5F may be equal to the angle $\theta_2$ of taper of the decelerating tapered surfaces 4B, 5B, so that the same thrust forces as those produced by meshing engagement of the decelerating tapered surfaces 4B, 5B can be produced by meshing engagement of the accelerating tapered surfaces 4F, 5F. In such a modification, a detector means 9 (FIG. 10) is preferably provided for detecting engagement and disengagement of the dog clutch 10 in order to prevent engagement or disengagement of the dog teeth with noise upon differential rotation of the hub 5 and the dog piece 4.

Figure 10:
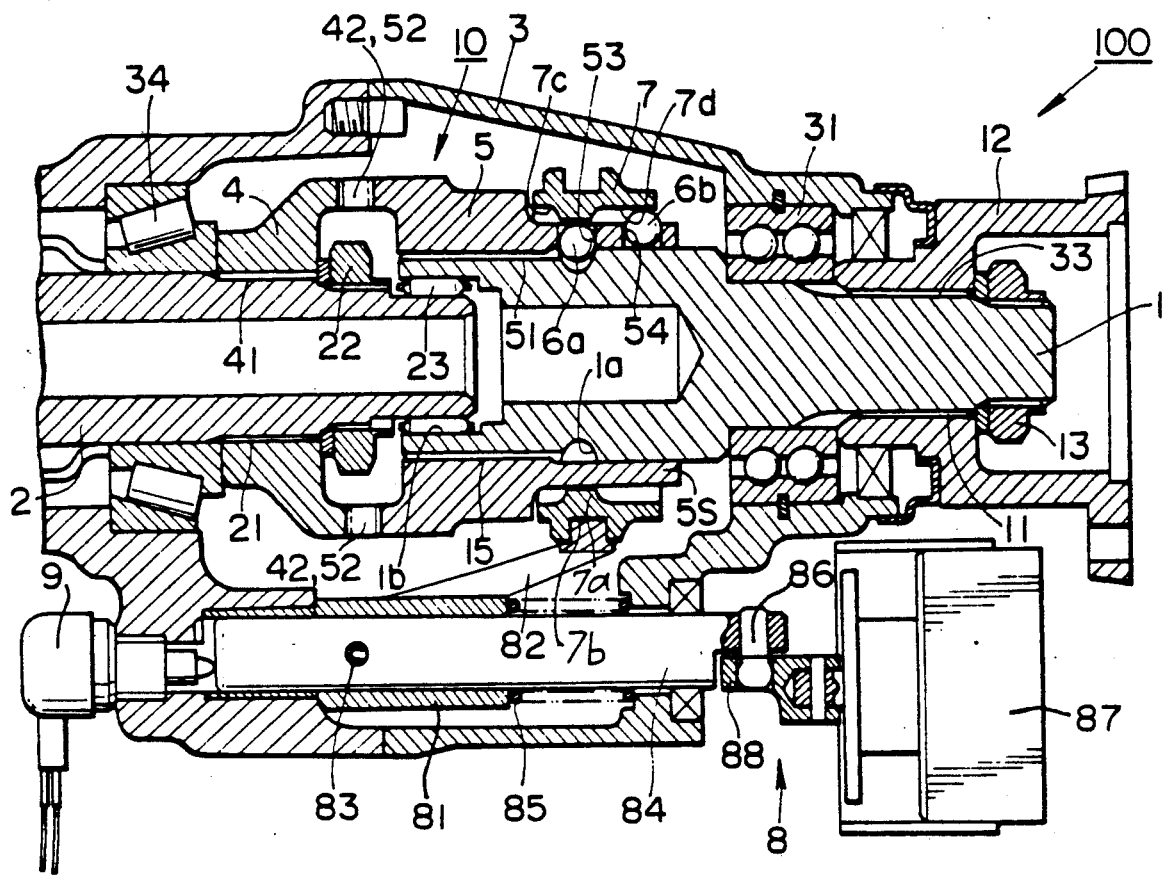
FIG. 10 is a longitudinal cross-sectional view of a dog clutch mechanism according to a modification of the first embodiment.
Figure 11:
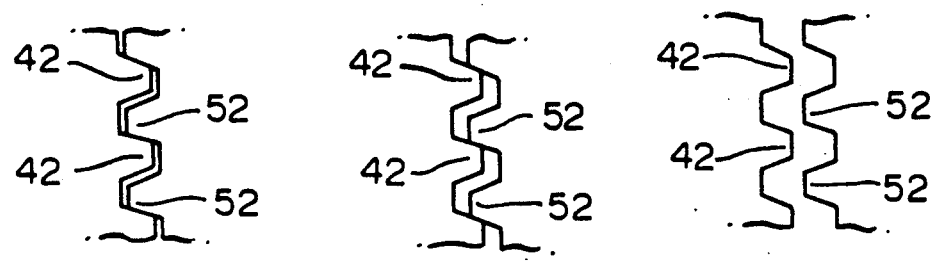
FIG. 11 is schematic views showing the manner in which dog teeth of the dog clutch mechanism shown in FIG. 10 are progressively brought out of mesh with each other.

In a dog clutch mechanism shown in FIG. 10 according to a modification of the first embodiment, while the torque is being transmitted from the input shaft 1 to the output shaft 2 through the engaged dog clutch 10, the solenoid 87 is energized to move the sleeve 7 forwardly through the shift rod 84 and the shift fork 81 against the bias of the return spring 85. First, the rear balls 6a are released from the groove 1a by the land 7a of the sleeve 7. Since thrust forces are generated by meshing engagement of the dog teeth 42, 52 of the dog piece 4 and the hub 5 during rotation, the balls 6 are displaced out of the groove 1a toward the guide surface 7c of the sleeve 7 under the thrust forces. At the same time, the hub 5 is moved forwardly on the input shaft 1 thereby to bring the dog teeth 42, 52 out of mesh with each other from the position of FIG. 11(a) through the position of FIG. 11(b) to the position of FIG. 11(c). By de-energizing the solenoid 87, the actuator 8 and the sleeve 7 are returned to the illustrated position under the bias of the return spring 85, thereby engaging the dog clutch 10. The thrust forces in the arrangement of FIG. 10 are generated not only when the torque being transmitted is varied, i.e., when the brake is applied, but also when the forward drive force is transmitted, i.e., when the accelerating tapered surfaces 4F, 5F are in mesh with each other.

The dog clutch 10 shown in FIG. 10 thus produces thrust forces due to meshing engagement of the dog teeth 42, 52 during all of the time that the torque is being transmitted, including the time in which the brake is applied. By utilizing the thrust forces, the torque transmission from the input shaft 1 to the output shaft 2 can be cut off with an operating force which is sufficient enough to move the sleeve 7 that controls the movement of the balls 6a.

According to the modification shown in FIG. 10, the detecting means 9 for detecting engagement and disengagement of the dog clutch 10 is mounted in the case 3. The detecting means 9 comprises a stroke switch which can be turned on or off when being pushed a certain distance by the rear end surface of the shift rod 84 of the actuator 8. Therefore, engagement and disengagement of the dog clutch 10 can be detected by the detecting means 9 based on how the shift rod 84 is shifted.

A detected signal from the detecting means 9 is applied to the control unit CPU on the vehicle as shown in FIG. 9. The control unit CPU issues a control signal to the solenoid 87 for operating the actuator 8. Under normal condition, the control unit CPU keeps the dog clutch 10 engaged. In this modification, when a detected signal from a detecting means (not shown) which detects the brake operating condition is ON, the control unit CPU generates a control signal to disengage the dog clutch 10. In a transition from the disengagement of the dog clutch 10 to the engagement thereof due to the brake operating condition signal being OFF, if the detected signal from the detecting means 9 still indicates the disengagement of the dog clutch 10 upon lapse of a prescribed period of time after the control signal to engage the dog clutch 10 has been issued, then the control unit CPU interrupts issuance of such control signal.

More specifically, as shown in FIG. 12, the control unit CPU determines whether the brake operating condition signal is ON or not in a step $P_1$. If ON, then the control unit CPU issues a control signal to disengage the dog clutch 10 in a step $P_2$. If OFF, then the control unit CPU issues a control signal to engage the dog clutch 10 in a step $P_3$. Upon lapse of a certain period of time in a step $P_4$ after the control signal to engage the dog clutch 10 has been issued, the control unit CPU determines whether the detected signal from the detecting means 9 is OFF (indicating clutch disengagement) or not in a step $P_5$. If OFF, then the control unit CPU issues a control signal to disengage the dog clutch 10 in the step $P_2$. If ON, then control goes back to the step $P_1$ for repeating the above process.

For practical reasons, the dog clutch 10 is allowed to be engaged only in a range in which the differential rotation between the input and output shafts 1, 2 is small and in which any noise and shock caused by engagement of the dog teeth 42, 52 do not pose problems. Outside that range, the dog clutch 10 is controlled to remain disengaged as shown in FIG. 11(c), i.e., any engagement thereof is interrupted.

With the above modification, as described above, when the control unit CPU applies a control signal to the actuator to engage the dog clutch 10, and if the detected signal from the detecting means 9 indicates, upon elapse of a given period of time, that the dog clutch 10 is disengaged due to large differential rotation between the input and output shafts 1, 2, the control signal applied to the actuator 8 by the control unit CPU to engage the dog clutch 10 is interrupted to keep the dog clutch 10 disengaged. Therefore, noise and shock which would otherwise result from engagement of the dog teeth can be eliminated. Therefore, the dog clutch mechanism is especially suitable for use in switching drive power in a four-wheel-drive vehicle.

In the aforesaid first embodiment and its modification, the meshing surfaces of the dog teeth are designed as tapered surfaces of selected angles (i.e., equal taper angles and different taper angles) for improving the manner in which to engage and disengage the dog teeth. The embodiments which follow are directed to dog clutch mechanisms in which the above basic principles are also employed unless specifically described otherwise and other approaches are taken to improve the manner in which the dog clutch are engaged and disengaged.

A dog clutch mechanism 200 according to a second embodiment of the present invention will be described below with reference to FIGS. 13 through 19.

As illustrated in FIG. 13, the dog clutch mechanism 200 of the second embodiment differs from the dog clutch mechanism 100 of the first embodiment in that a dog clutch 20 comprises a hub 224 mounted on an output shaft 211 and a dog piece 221 mounted on an input shaft 201. Of course, the hub 224 may be mounted on the output shaft 211 and the dog piece 221 may be mounted on the input shaft 201 as with the first embodiment.

The input shaft 201 has a rear end rotatably fitted in a circular hole 212 defined in the front end of the output shaft 211 through a bearing 209. The dog piece 221 is fitted over the rear end portion of the input shaft 201 through splines 203, 222 and fixed thereto by means of a nut 208. The hub 224 is substantially shaped as a hollow cylinder fitted over the front end of the output shaft 211 through splines 213, 225 for axial sliding movement thereover, but rotation therewith.

The dog piece 221 and the hub 224 have on their confronting axial surfaces a multiplicity of dog teeth 223, 227 which are capable of axially meshing with each other. The hub 224 having an inner peripheral sliding surface with the splines 225 formed thereon serves to guide the dog teeth 227 for axial movement into mesh with the dog teeth 223. Each of the dog teeth 223, 227 may have meshing surfaces one of which is a tapered surface having a taper angle for producing thrust forces as with the first embodiment. In the second embodiment, however, both meshing surfaces of each of the dog teeth 223, 227 are tapered surfaces having taper angles capable of producing thrust forces. Upon meshing engagement between the both tapered surfaces during torque transmission, thrust forces are produced to move the hub 224 in the rearward direction.

The hub 224 has a plurality of circumferentially spaced radial holes 228 defined in a rear end portion thereof and a plurality of similar holes 229 positioned behind the holes 228. Balls 231, 232 are disposed respectively in the holes 228, 229. The output shaft 211 has an annular groove 215 defined in the outer peripheral surface of a front portion contiguous to the rear ends of the splines 213, and the balls 231 can be pushed into the groove 215. A sleeve 233 is axially slidably disposed around the rear portion of the hub 224, and has an annular land 234 disposed on the inner periphery of its intermediate portion for pushing the front balls 231 into the groove 215 of the output shaft 211. The sleeve 233 is coupled to a shift fork 235 which can manually or automatically be operated.

A clutch engagement checking device 240 is disposed between the input and output shafts 201, 211. The clutch engagement checking device 240 mainly comprises a cylinder 204, a piston 241 inserted in the cylinder 204 with a highly viscous fluid 249 between the cylinder 204 and the piston 241, a cam 242, a torsion bar 245, and a ball 248.

More specifically, the cylinder 204 is formed axially on the rear end of the input shaft 1, and the piston 241 is movably disposed in the cylinder 204. The highly viscous fluid 249 such as silicone oil is filled between the outer periphery of the piston 241 and the inner periphery of the cylinder 204 and sealed in place by front and rear seals 205, 206. The piston 241 has a rear end projecting axially from the cylinder 204 and having the cam 242 thereon as a radially outward flange. The cam 242 has a recess 243 defined in an outer peripheral surface thereof as shown in FIG. 14. The output shaft 211 has a guide hole 214 defined radially through an intermediate portion of one or more of the splines 213 on the front end thereof. The hub 224 has an annular second groove 226 defined in an intermediate portion of the inner sliding surface thereof on which the splines 225 are formed.

The ball 248 is disposed in the guide hole 214 and held against the outer peripheral surface of the cam 242 for engagement in the groove 226. The piston 241 has a polygonal hole 244 defined centrally in the rear end surface thereof. The output shaft 211 has a smaller-diameter cylindrical hole 216 defined in the front end thereof and contiguous to the circular hole 212, and a polygonal hole 217 defined centrally in the bottom of the cylindrical hole 216. The torsion bar 245 has opposite polygonal ends 246, 247 fitted respectively in the polygonal holes 244, 217 so as to be gripped by the piston 241 and the output shaft 211. The cam 242 has a rear end which is prevented from rearward movement by a step 218 of the output shaft 211 between the circular hole 212 and the cylindrical hole 216.

The dog clutch mechanism 200 is mounted on the propeller shaft PS extending from the front drive unit FDU coupled to the engine E toward the rear drive unit RDU in the four-wheel-drive vehicle as shown in FIG. 9. By manually or automatically moving the shift fork 235, the dog clutch 20 can be engaged to drive the vehicle in the four-wheel-drive mode or disengaged to drive the vehicle in the two-wheel-drive mode.

In a transition from the two-wheel-drive mode to the four-wheel-drive mode, if the differential rotation between the input and output shafts 201, 211 is large, then the dog clutch 20 is prevented from being engaged, and is kept disengaged by the clutch engagement checking device 240.

More specifically, when the vehicle is driven in the two-wheel-drive mode with the dog clutch 20 disengaged as shown in FIG. 15, the rotative power from the input shaft 201 is transmitted to the piston 241 through the highly viscous fluid 249 filled between the inner periphery of the cylinder 204 and the outer periphery of the piston 241. At this time, since the torsion bar 245 is present between the piston 241 and the output shaft 211 to which no torque is directly transmitted from the input shaft 201, the piston 241 is rotated while twisting the torsion bar 245. The rotation of the piston 241 pushes the ball 248 out of the recess 243 of the cam 242 onto the outer peripheral surface of the cam 242, as shown in FIG. 16. The ball 248 engages in the second groove 226 in the inner periphery of the hub 224, as shown in FIG. 15. Therefore, the hub 224 is prevented from axially moving toward the dog piece 221, so that the dog clutch 20 is prevented from being engaged, but remains disengaged.

Figure 17:
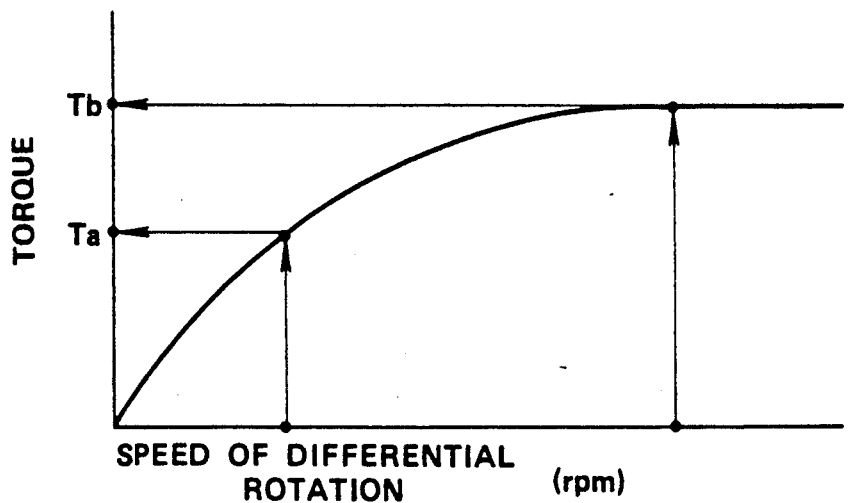
FIG. 17 is a graph showing torque vs. differential rotation characteristics of the dog clutch mechanism according to the second embodiment.
Figure 18:
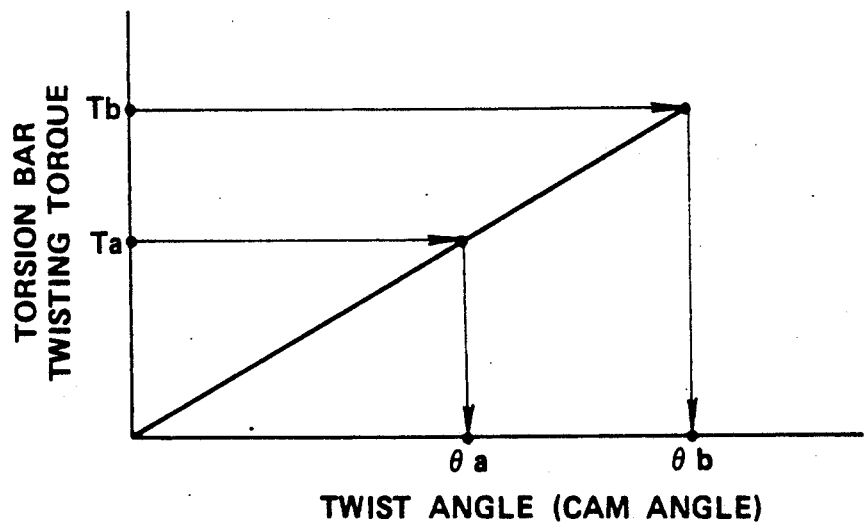
FIG. 18 is a graph showing torque vs. twisting angle characteristics of a torsion bar of the dog clutch mechanism of the second embodiment.
Figure 19A:
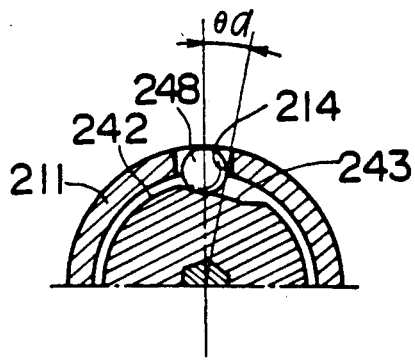
FIGS. 19(a) and 19(b) are fragmentary cross-sectional views illustrating two operating conditions of a cam and a ball in the dog clutch mechanism of the second embodiment.
Figure 19B:
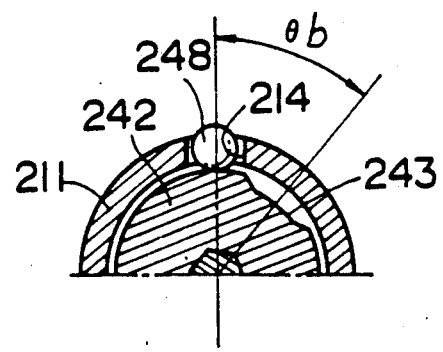

FIG. 17 shows the torque vs. differential rotation curve of the dog clutch 20, and FIG. 18 illustrates the torque vs. twisting angle curve of the torsion bar 245. The torques Ta, Tb in FIGS. 17 and 18 correspond respectively to angles $\theta a$, $\theta b$ of angular displacement of the cam 242 as shown in FIGS. 19(a) and 19(b). The lower limit of a differential rotation speed range in which the dog clutch 20 is prevented from being engaged is selected to avoid the transmission of excessive torque and prevent noise and shock due to meshing engagement of the dog teeth 223, 227.

If the differential rotation speed range is of a small prescribed value allowing the dog clutch 20 to be engaged, i.e., if the torque is lower than Ta and the angle of angular displacement of the cam 242 is smaller than $\theta a$, the hub 224 is no longer stopped by the ball 248, and the dog clutch 20 is engaged as shown in FIG. 13 to drive the vehicle in the four-wheel-drive mode.

The hub 224 may be disposed on the input shaft 201, and the dog piece 221 may be disposed on the output shaft 211. The dog clutch 20 is not limited to the construction of this embodiment, but may be of any desired structure. The structure and arrangement of the clutch engagement checking device 240 are also not limited to the illustrated embodiment, but may be modified.

With the second embodiment, as described above, upon a transition from the disengaged state to the engaged state of the dog clutch 20, if the differential rotation between the input and output shafts 201, 211 is greater than a prescribed value, the dog clutch 20 is kept in the disengaged state by the clutch engagement checking device 240. Consequently, the input and output shafts 201, 211 are prevented from being coupled to each other, i.e., the dog teeth 223, 227 are prevented from meshing with each other, to reduce or eliminate noise and shock. The dog clutch mechanism 200 is therefore particularly suitable for switching the drive force between the two-wheel-drive mode and the four-wheel-drive mode in the four-wheel-drive vehicle.

In the dog clutch mechanism 200, if the differential rotation between the input and output shafts 201, 222 is greater than the prescribed value, then the clutch engagement checking device 240 forcibly prevents the dog clutch 20 from being engaged, but keeps the dog clutch 20 disengaged. Since the clutch engagement checking device 240 couples the input and output shafts 201, 211 indirectly to each other through the highly viscous fluid 249, it can quickly reduce the differential rotation between the input and output shafts 201, 211, and hence serves as a semisynchromesh means.

A third embodiment of the present invention, which will be described below, improves the manner in which the dog clutch is engaged and disengaged according to still another approach.

A dog clutch mechanism 300 according to the third embodiment will be described below with reference to FIGS. 20 through 29.

FIG. 20 shows in cross section the dog clutch mechanism 300 of the third embodiment. The dog clutch mechanism 300 comprises an input shaft 301, an output shaft 302, and a dog clutch 30 comprising a hub 304 mounted on the input shaft 301 and a dog piece 305 mounted on the output shaft 302. The dog clutch mechanism 300 also includes a blocking member 306 mounted coaxially on the outer periphery of the dog piece 305 through a highly viscous fluid 307 therebetween. The blocking member 306 has a limiting mechanism for limiting sliding movement of the hub 304.

The hub 304 is axially slidably fitted over the end of the input shaft 301 near the output shaft 302 through splines 311, 341, and the dog piece 305 is fitted over the end of the output shaft 302 near the input shaft 301 and axially positioned thereon by means of a circlip 322. The hub 304 and the dog piece 305 have respective dog teeth 345, 355 on their confronting ends.

The dog piece 305 comprises a tubular barrel 352 having an inner sliding surface having splines 351 meshing with splines 321 on the outer peripheral surface of the output shaft 302, and a flange-shaped base portion 353 disposed on a rear portion of the barrel 352 and having the dog teeth 355. The barrel 352 of the dog piece 205 projects into the hub 304. The tubular blocking member 306 serving as a limiting member is disposed coaxially around the dog piece barrel 352 with the highly viscous fluid 307 (silicone oil in this embodiment) therebetween. The highly viscous fluid 307 filled in a radial gap between the outer periphery of the barrel 352 and the inner periphery of the blocking member 306 is sealed by seal rings 366, 367.

To facilitate rotation of the blocking member 306 with respect to the dog piece 305, a thrust washer 368 is interposed between the dog piece base portion 353 and an end face of the blocking member 306, and a thrust washer 369 is also interposed between the circlip 359 fitted over the distal end of the dog piece barrel 352 and the opposite end face of the blocking member 306. Particularly, the thrust washer 369 disposed between the circlip 359 which is of a partly circular shape and the blocking member 306 allows smooth rotation of the blocking member 306 relatively on the dog piece barrel 352.

The highly viscous fluid 307 can be filled in place by pouring the highly viscous fluid 307 through a hole 364 defined in the blocking member 306, and then closing off the hole 364 with a bolt 365, as shown in FIG. 21.

The blocking member 306 has, on the outer periphery of the distal end thereof, engaged members 361 capable of engaging engagement with members on the distal ends of the splines 341 near the output shaft 302, the splines 341 being formed axially on the inner sliding surface of the hub 304. Each of the engaged members 361 and a corresponding one of the engaging members on the spline 341 have limiting surfaces 362 and limited surfaces 342, respectively, as shown in FIG. 22. The limiting surfaces 362 are tapered surfaces inclined symmetrically at the same angles, and the limited surfaces 342 are also similar tapered surfaces capable of surface-to-surface contact with the limiting surfaces 362. Thus, the blocking member 306 and the hub 304 have chamfered surfaces.

The dog clutch 30 can be shifted by a shift mechanism 308. As shown in FIG. 20, the shift mechanism 308 comprises a shift fork 381, a shift rod 383, and a shift spring 385. The shift fork 381 has a finger 382 fitted in a groove 348 defined in an outer periphery of the hub 304. The shift fork 381 is coupled by a spring pin 384 to the shift rod 383 which is slidably supported on a clutch case 309. The shift spring 385 is disposed under compression around the shift rod 383 between the shift fork 381 and the clutch case 309.

The shift spring 385 is shown as being compressed in FIG. 20 for resiliently urging the shift fork 381 in a shifting direction indicated by the arrow S. The hub 304 is thus also moved toward the dog piece 305 under the spring force. Since the limiting surfaces 362 of the blocking member 306 and the limited surfaces 342 of the splines 341 are symmetrical tapered surfaces or chamfered surfaces which are capable of surface-to-surface contact with each other as shown in FIG. 22, when there is differential rotation between the input and output shafts 301, 302, the chamfered surfaces (i.e., the limiting surfaces 362 and the limited surfaces 342) abut against each other to cause the hub 304 and the blocking member 306 to rotate with each other.

The blocking member 306 is disposed on the barrel 352 of the dog piece 305 with the radial gap defined therebetween and the radial gap is filled with the highly viscous fluid (silicone oil) 307, as described above. Accordingly, shearing resistance is developed between the blocking member 306 and the dog piece 305 dependent on the differential rotation by the highly viscous fluid 307. The shearing resistance tends to rotate the blocking member 306 in the direction of the arrow L in FIG. 22($a$) or in the direction of the arrow R in FIG. 22($b$).

If the shearing resistance produced by the highly viscous fluid 307 in proportion to the differential rotation is greater than the component in the rotating direction of the shifting force (spring force) of the hub 304, i.e., the force tending to push aside the blocking member 306, then the dog teeth 345 of the hub 304 are not in mesh with the dog teeth 355 of the dog piece 305 as illustrated. If the differential rotation is smaller than a certain level and the force tending to push aside the blocking member 306 is greater than the shearing resistance produced by the blocking member 306, the hub 304 pushes aside the blocking member 306 in the same rotating direction as that of the hub 304 with the chamfered surfaces (i.e., the limited surfaces 342 and the limiting surfaces 362), whereupon the dog teeth 345, 355 start to mesh with each other.

As described above, the dog clutch mechanism 300 of the third embodiment includes, in addition to the dog clutch 30, a sliding movement limiting mechanism having a viscous coupling means composed of the barrel 352 of the dog piece 305 and the tubular blocking member 306 disposed coaxially around the barrel 352 with the highly viscous fluid 307 therebetween, and an engaging mechanism composed of the engaged members on the outer periphery of the blocking member 306 and the engaging members on the inner peripheral sliding surface of the hub 304. When the speed of differential rotation between the input and output shafts 301, 302 is higher than a certain level, the hub 304 and the blocking member 305 tend to rotate in unison with each other. Since the shearing resistance of the highly viscous fluid 307 is large, as described above, only the limited surfaces 342 and the limiting surfaces 362 are held against each other, and the dog teeth 345 of the hub 304 are not in mesh with the dog teeth 355 of the dog piece 305. The speed of differential rotation is then progressively lowered inasmuch as the torque from the input shaft 301 is progressively transferred to the output shaft 302 through the highly viscous fluid 307. When the differential rotation speed becomes lower than the certain level, the limited surfaces 342 and the limiting surfaces 362 are brought out of abutment against each other, and the hub 304 starts moving to bring the dog teeth 355, 345 into mesh with each other. The sliding movement limiting mechanism in this embodiment therefore doubles as a synchronizing mechanism.

The difference between the dog clutch mechanism 300 of the present invention and the conventional Warner-type synchronizing mechanism will briefly be described below.

Figure 27:
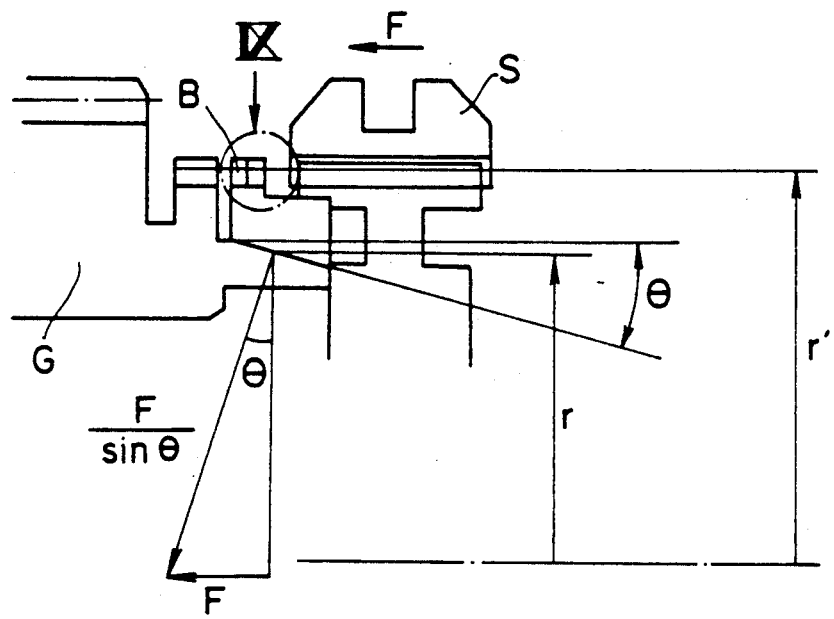
FIG. 27 is a schematic view explaining a theoretical analysis of dynamic characteristics of a conventional synchronizing mechanism.
Figure 28:
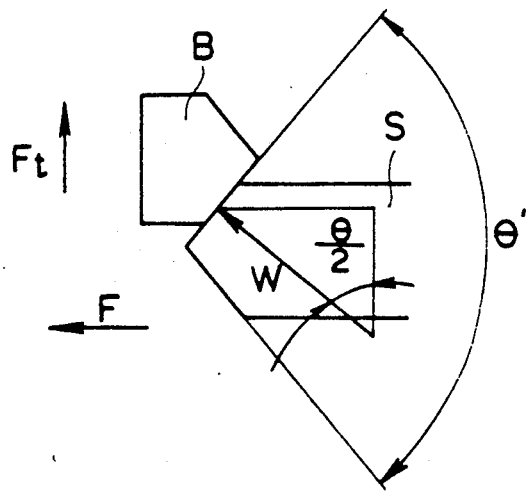
FIG. 28 is an enlarged developed view of a portion encircled by C.
Figure 29:
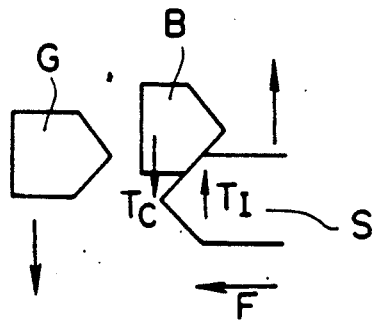
FIG. 29 is an enlarged developed view similar to FIG. 28, with a dog piece being also shown.

FIG. 27 schematically shows a conventional synchronizing mechanism including a hub S, a dog piece G, and a blocking ring B. FIG. 28 is a developed representation of meshing chamfered surfaces of the blocking ring B and the hub S. FIG. 29 is a developed representation similar to FIG. 28, also showing the dog piece G.

Various symbols in FIGS. 27, 28, 29 are defined as follows:

F: Operating force for the hub S,
$\theta$: Taper angle of a cone,
$\theta'$: Chamfer angle of the hub S and the blocking ring B,
W: Perpendicular resistive force applied to the chamfered surface by the operating force F,
$\mu A$: Coefficient of friction of the tapered surface of the cone,
$\mu B$: Coefficient of friction of the chamfered surface
r: Effective radius of the cone
r': Effective radius of the chamfered surface, and
Ft: Force produced on r' in the rotating direction.

When the hub S is moved in the direction of the arrow with the operating force F, a frictional torque Tc is generated on the tapered surface of the cone, the frictional torque Tc being expressed by:

$$Tc = \frac{\mu A \cdot r \cdot F}{\sin \theta}$$

On r', the following equations are established due to balanced forces on the chamfered surface:

$$F = W \cdot \sin \frac{\theta'}{2} + \mu B \cdot W \cdot \cos \frac{\theta'}{2}$$

$$\text{Hence, } W = \frac{F}{\sin \frac{\theta'}{2} + \mu B \cdot \cos \frac{\theta'}{2}}$$

$$Ft = W \left( \cos \frac{\theta'}{2} - \mu B \cdot \sin \frac{\theta'}{2} \right)$$

Therefore, the force $T_I$ in the rotating direction for pushing aside the blocking ring B on the chamfered surface is given by:

$$T_I = r' \cdot F \cdot \frac{\cos \frac{\theta'}{2} - \mu B \cdot \sin \frac{\theta'}{2}}{\sin \frac{\theta'}{2} + \mu B \cdot \cos \frac{\theta'}{2}}$$

Normally, the synchronizing mechanism is not established unless $Tc > T_I$.

If there is differential rotation between the dog piece G and the hub S, the hub S continues to push the blocking ring B as shown in FIG. 19. After the dog piece G and the blocking ring B is synchronized by Tc (differential rotation is zero), the blocking ring B joined to the dog piece G by $T_I$ is rotated in the same direction as that of the hub S to bring the dog piece G and the hub S into mesh with each other.

If the inertial masses of the dog piece G and the hub S are sufficiently large (as compared with Tc) in this process, the hub S has to be stopped for a long period of time in the condition of FIG. 29. That is, the shifting operation is not completed until the speed of differential rotation between the dog piece G and the hub S becomes zero.

The dog clutch mechanism 300 of the present invention differs from the conventional synchronizing mechanism in that the frictional torque Tc for limiting the axial movement of the hub 304 is proportional to the speed of differential rotation.

Figure 23:
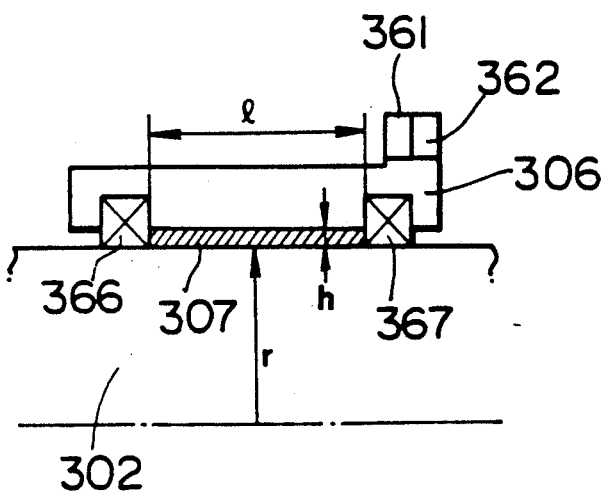
FIG. 23 is a schematic cross-sectional view of a viscous coupling mechanism in the dog clutch mechanism of the third embodiment.

More specifically, assuming in FIG. 23 that the torque (shearing resistance) produced by the viscous coupling (highly viscous fluid 307) due to the differential rotation between the blocking member 306 and the output shaft 302 is Tcn, this torque can be expressed as follows:

$$Tcn = \mu \cdot \frac{4\pi^2 \cdot r^3 \cdot n \cdot l}{h}$$

where
$\mu$: viscosity coefficient of the highly viscous fluid 307,
r: effective radius of the viscous coupling,
n: speed of differential rotation between the blocking ring 306 and the output shaft 302,
l: width of the viscous coupling, and
h: radial gap between the blocking ring 106 and the output shaft 302.

Assuming that the speed of differential rotation at which the hub 304 and the dog piece 305 can smoothly mesh with each other is $n_o$, the various dimensions should be determined to meet:

$Tcn > T_I$ if $n > n_o$, and $Tcn \leq T_I$ if $n \leq n_o$.

Therefore, the dog clutch mechanism 300 can have a range of speeds of differential rotation selected as desired for allowing the hub to be shifted.

Figure 24:
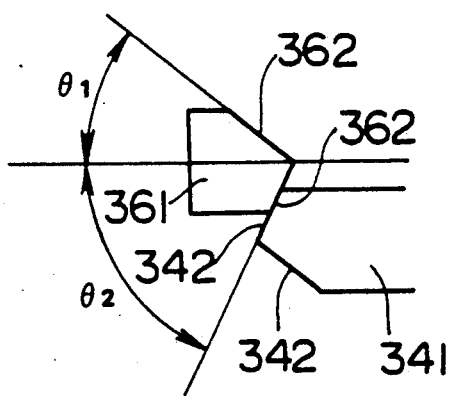
FIG. 24 is a schematic view showing abutment between modified engaged portions of the blocking member and engaging portions of the sleeve.

The speed of differential rotation for shifting the hub may be varied dependent on the direction of differential rotation by making the chamfer angles of the limiting and limited surfaces 362, 342, asymmetrical as $\theta_1$, $\theta_2$, ($\theta_1 < \theta_2$) as shown in FIG. 24.

The dog clutch mechanism 300 with the asymmetrical chamfer angles as shown in FIG. 24 may be employed as a clutch in a four-wheel-drive vehicle for releasing the four-wheel-drive mode when the vehicle is braked. Such an arrangement will be described below.

Figure 25:
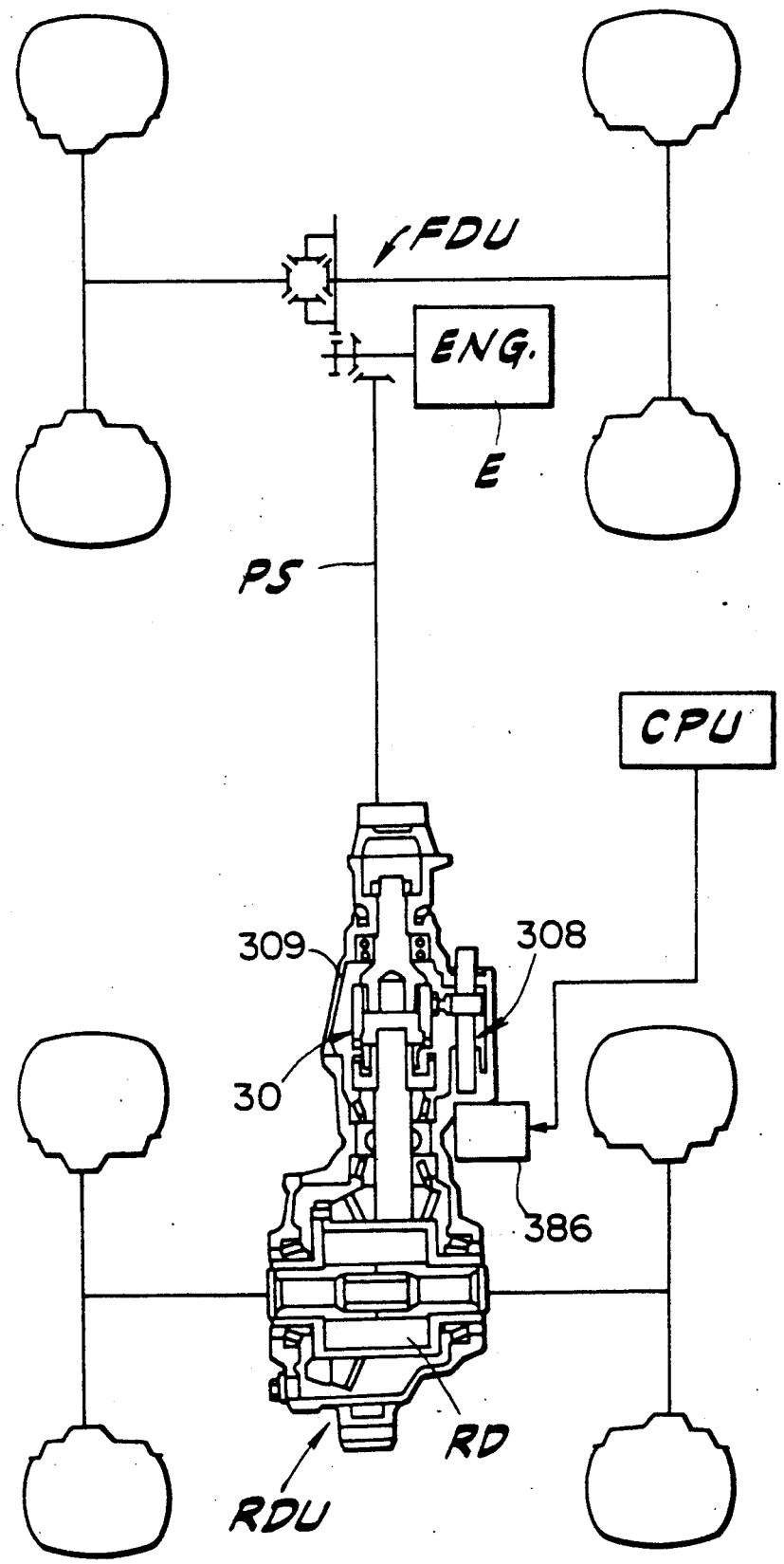
FIG. 25 is a schematic plan view of the drive line system of a four-wheel-drive vehicle in which the dog clutch mechanism of the third embodiment of the present invention can be incorporated.

FIG. 25 schematically shows a four-wheel-drive vehicle similar to FIG. 9. The dog clutch 30 is mounted on the propeller shaft PS extending from the front drive unit FDU directly coupled to the engine E toward the rear drive unit RDU. Denoted at RD is a viscous coupling doubling as a rear differential and a central differential. The shift mechanism 308 for the dog clutch 30 is operated by an actuator 386 which is controlled by a vehicle-mounted computer CPU.

Normally, the vehicle is held in the four-wheel-drive mode by the engaged dog clutch 30. When the brake is applied, the dog clutch 30 is disengaged to hold the vehicle in the two-wheel-drive mode for thereby preventing the braking force distribution between the front and rear wheels from being varied.

It is assumed in this four-wheel-drive vehicle that after the dog clutch 30 is disengaged upon braking and before the dog clutch 30 is engaged, the vehicle is quickly accelerated, or the brake is turned off after both accelerator and brake pedals have been depressed in the case where the vehicle is equipped with an automatic transmission. Since in this case the vehicle is to be accelerated in the four-wheel-drive mode from the condition in which the rotational speed of the front wheels is higher than the rotational speed of the rear wheels, it is preferable that the dog clutch 30 can be engaged even if the speed of differential rotation is large (the speed of rotation of the front wheels > the speed of rotation of the rear wheels).

In order for the dog clutch 30 to be able to be engaged even if the speed of differential rotation is large (the speed of rotation of the front wheels > the speed of rotation of the rear wheels), the chamfer angle in the direction of differential rotation should be selected to be the smaller $\theta_1$ to facilitate engagement of the clutch.

When the brake is turned off to return to the four-wheel-drive mode after the vehicle has been abruptly braked, since the braking force for the front wheels is generally greater than the braking force for the rear wheels, the vehicle returns to the four-wheel-drive mode from the condition in which the speed of rotation of the front wheels is lower than the speed of rotation of the rear wheels, and hence if the dog clutch 30 were abruptly engaged, then the speed of rotation of the rear wheels would be greatly lowered.

Therefore, if the speed of differential rotation (the speed of rotation of the front wheels < the speed of rotation of the rear wheels) is large, because it is better to gradually engage the dog clutch 30, the chamfer angle in the direction of differential rotation (the direction opposite to that when the speed of rotation of the front wheels > the speed of rotation of the rear wheels) should be selected to be the larger $\theta_2$.

Figure 26:
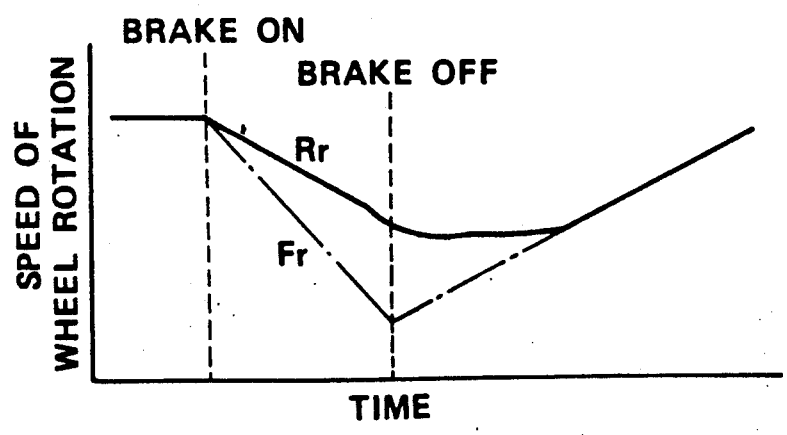
FIG. 26 is a graph showing characteristics available when the dog clutch mechanism of the third embodiment is incorporated in the vehicle of FIG. 25.

The dog clutch 30 is thus prevented from being quickly engaged when returning to the four-wheel-drive mode after the vehicle has been abruptly braked, and the dog clutch 30 is gradually engaged, as shown in FIG. 26.

Denoted in FIG. 26 at Fr is a change in the speed of rotation of the front wheels, and Rf is a change in the speed of rotation of the rear wheels.

The dog clutch mechanism 300 of the third embodiment may be employed in various other applications other than the clutch between the front and rear wheels of the four-wheel-drive vehicle.

With the third embodiment, as described above, there is provided a limiting member for limiting the axial sliding movement of the hub with a limiting force which increases dependent on the differential rotation between the hub and the dog piece, and for allowing the dog piece and the hub to mesh with each other when the speed of differential rotation is lower than a prescribed level. Therefore, if the speed of differential rotation is lower than the given level even if the inertial mass of the synchronized member is sufficiently large, the dog piece and the hub are allowed to mesh with each other, and hence the input and output shafts can be smoothly coupled to each other.

The dog clutch mechanism according to each of the first, second, and third embodiments can be incorporated in the four-wheel-drive vehicles as illustrated in FIGS. 9 and 25. In those vehicles, the dog clutch mechanism is mounted on the power transmitting system or propeller shaft PS between the front drive unit FDU and the rear drive unit RDU and in front of the rear differential RD.

When towing the four-wheel-drive vehicle at the time it has some trouble or when inspecting the drive system of the vehicle, it is desirable that the power transmitting system be cut off between the front and rear wheels. For this purpose, a manual actuating mechanism is provided for manaully disengaging the dog clutch of the dog clutch mechanism. Since the manual actuating mechanism is not normally actuated and hence no consideration is given to the ease with which it is to be actuated, the actuating member of the manual actuating mechanism is positioned near the dog clutch such as on the outer wall of the clutch case, thereby simplifying the structure of the mechanism.

Since the actuating member of the manual actuating mechanism is positioned such that it cannot easily be visually recognized by the driver of the vehicle, the driver may forget to return the manual actuating mechanism to its inactivated condition when the vehicle is to resume its normal running state after the dog clutch has been disengaged by operating the actuating member as when towing the vehicle.

According to a fourth embodiment of the present invention, the above problem can be solved by providing a dog clutch mechanism capable of notifying the driver of how the manual actuating mechanism is operated by the actuating member which is positioned in a location that cannot easily be visually recognized by the driver, and of allowing the driver to return the the manual actuating mechanism to its inactivated condition.

A dog clutch mechanism 400 according to a fourth embodiment of the present invention will be described below with reference to FIGS. 30 through 33.

Figure 30:
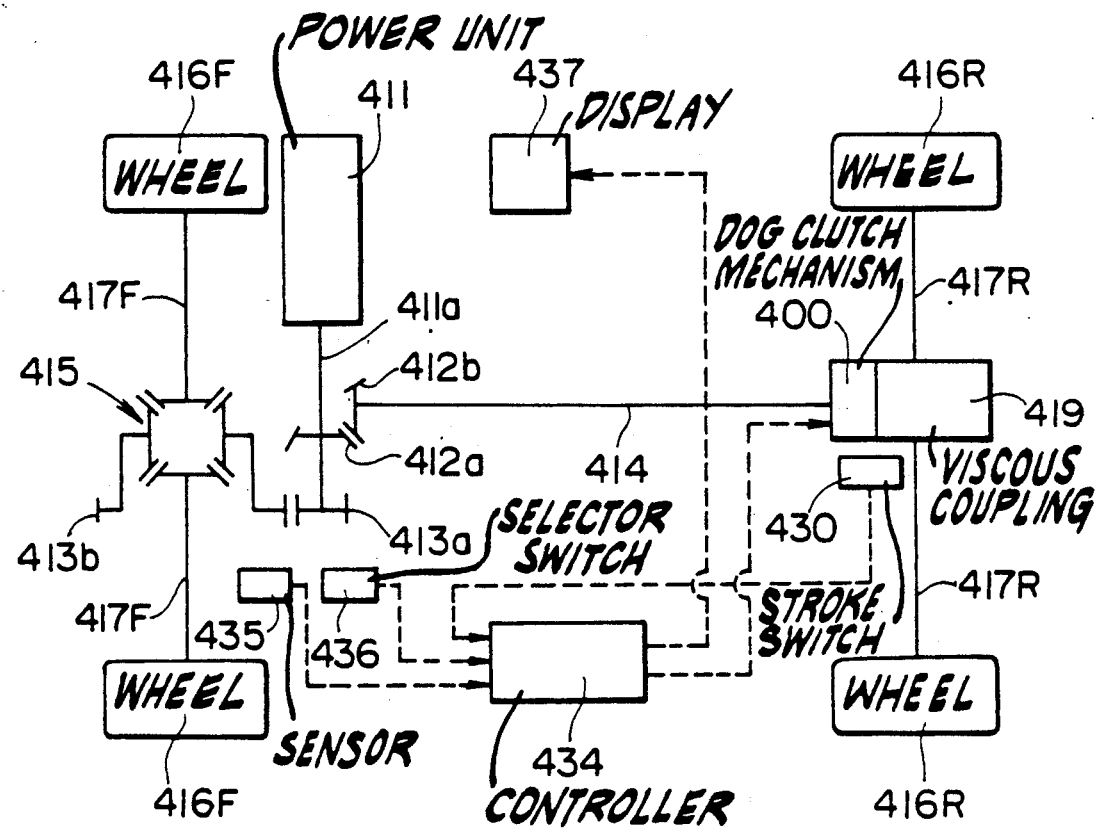
FIG. 30 is a schematic plan view of the drive line system of a four-wheel-drive vehicle in which the dog clutch mechanism of a fourth embodiment of the present invention can be incorporated.

FIG. 30 schematically shows in plan a power transmitting system of a four-wheel-drive vehicle incorporating the dog clutch mechanism 400 of the fourth embodiment. Denoted in FIG. 30 at 411 is a power unit comprising an engine and a transmission. The power unit 411 has an output shaft 411a to which a bevel gear 412a and a spur gear 413a are fixed. The bevel gear 412a is held in mesh with a bevel gear 412b fixed to the front end of a propeller shaft 414, and the spur gear 413a is held in mesh with a driven gear 413b of a front differential 415, so that the output shaft 411a can transmit engine power to the propeller shaft 414 and the front differential 415. The front differential 415 is coupled to a pair of laterally spaced front wheels 416F through respective axles 417F. Therefore, the front wheels 416F are operatively coupled to the power unit 411 while allowing their differential rotation. The propeller shaft 414 is coupled at a rear end thereof to a viscous coupling 419 serving as a central differential and also a rear differential through the dog clutch mechanism 400 which can selectively drive the vehicle in a two-wheel-drive mode or in a four-wheel-drive mode. The dog clutch mechanism 400 and the viscous coupling 419 are coupled to the rear end of the propeller shaft 414. The viscous coupling 419 is operatively coupled to a pair of laterally spaced rear wheels 416R through respective axles 417R.

As shown in FIGS. 31(a), 31(b), 32(a), and 32(b), the dog clutch mechanism 400 of the fourth embodiment has substantially the same construction as that of the dog clutch mechanism 100 of the first embodiment. More specifically, the dog clutch mechanism 400 includes a clutch case 420 and a dog clutch 40 disposed in the clutch case 420. An input shaft 421 coupled to the propeller shaft 414, and an output shaft 422 coupled to the viscous coupling 419 are coaxially and rotatably supported in the clutch case 420. The dog clutch 40 comprises a hub 423 fitted over the end of the input shaft 421 facing the output shaft 422 through splines, and a dog piece 425 mounted on the end of the output shaft 422 facing the input shaft 421 through a torsion bar 424. The hub 423 and the dog piece 425 have respective dog teeth 423a, 425a on their confronting end faces which can be taken into and out of meshing engagement with each other.

The hub 423 axially slidably splined on the input shaft 421 has radial holes defined therein and receiving balls 426a, 426b, respectively. The balls 426a can engage in an annular groove 421a defined in the outer periphery of the input shaft 421. A sleeve 427 slidably disposed on the hub 423 has an inner periphery for engaging the balls 426a to push then into the annular groove 421a. A shift fork 428 has a finger 428a engaging the outer periphery of the sleeve 427. The sleeve 427 can be axially slid by the shift fork 428 to move the balls 426a into the annular groove 421a for limiting the axial movement of the hub 423.

The shift fork 428 has a cylindrical tubular portion 428b on its base, and the finger 428a integrally projects from the outer periphery of the tubular portion 428b, the tubular portion 428b being fixed to a shift shaft 249. A projection 428c is formed on the outer peripheral surface of the tubular portion 428b for engagement with a stroke switch 430. A raised portion 428d is also integrally formed with the outer peripheral surface of the tubular portion 428b for engaging a manual switching mechanism 431.

The shift shaft 429 is axially movably supported parallel to the input and output shafts 421, 422 and has one end engaging an electromagnetic actuator 432 so as to be axially pushed thereby. A return spring 433 is disposed under compression around the other end portion of the shaft shaft 429 between an end face of the tubular portion 428b of the shift fork 428 and an inner wall surface of the clutch case 420. The return spring 433 serves to apply an axial urging force opposite the force generated by the electromagnetic actuator 432.

As shown in FIG. 30, the stroke switch 430 is electrically connected to a controller 434. The stroke switch 430 has a detecting element engageable with the projection 428c of the shift fork 428 for turning on a switch element in the stroke switch. The electromagnetic actuator 432 has a plunger for engaging the shift shaft 429 and a solenoid for urging the plunger, the solenoid being electrically connected to the controller 434.

As illustrated in FIG. 30, to input terminals of the controller 434, there are connected the stroke switch 430, sensors 435 for detecting the running condition of the vehicle, and a selector switch 436 for selecting one of two- and four-wheel-drive modes. The controller 434 has output terminals connected to the electromagnetic actuator 432 and a display unit 437. The controller 434 controls operation of the electromagnetic actuator 432 and the display unit 437 based on output signals from the sensors 430, 435 and the selector switch 436. The display unit 437 is positioned near the driver's seat in the passenger's compartment of the vehicle. The display unit 437 is responsive to an output signal from the controller 434 for indicating, to the driver, the disengaging condition of the dog clutch 40 by way of a buzzer or a lamp when the dog clutch 418 is disengaged.

Figure 31A:
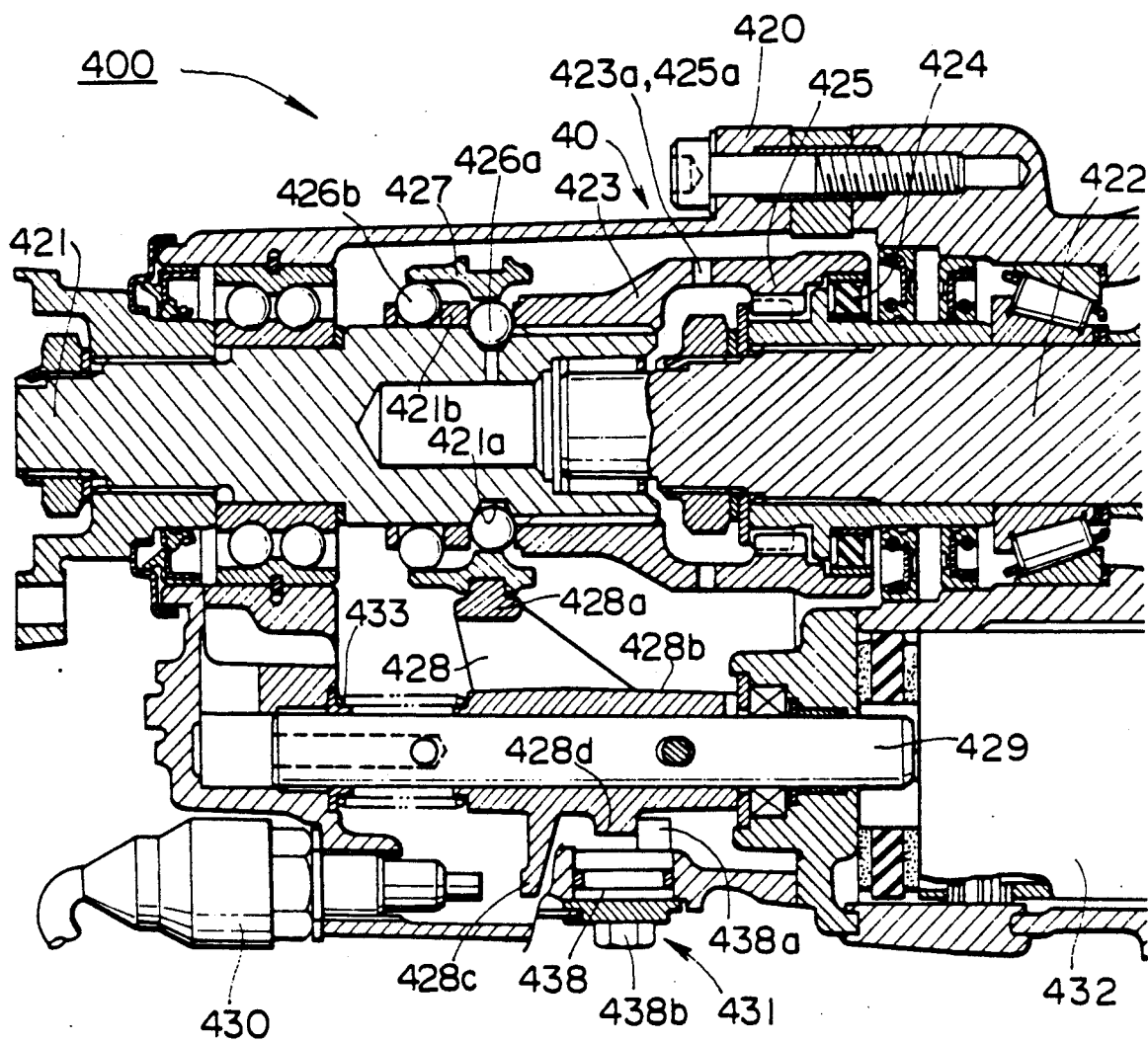
FIG. 31(a) is a longitudinal cross-sectional view of the dog clutch mechanism of the fourth embodiment as it is engaged.
Figure 31B:
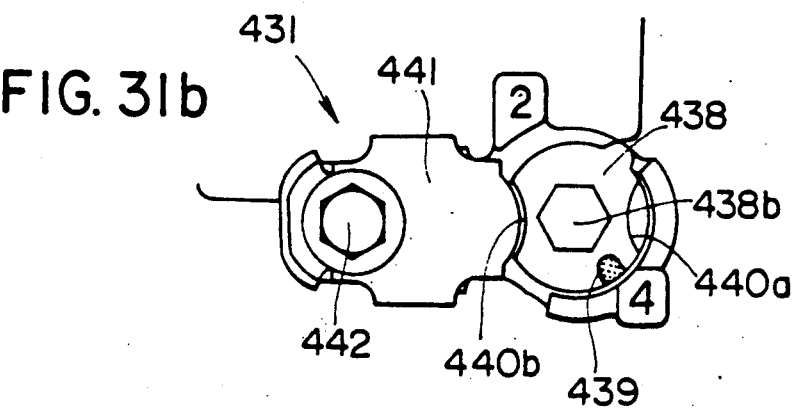
FIG. 31(b) is a plan view of a portion of the dog clutch mechanism shown in FIG. 31(a)
Figure 32A:
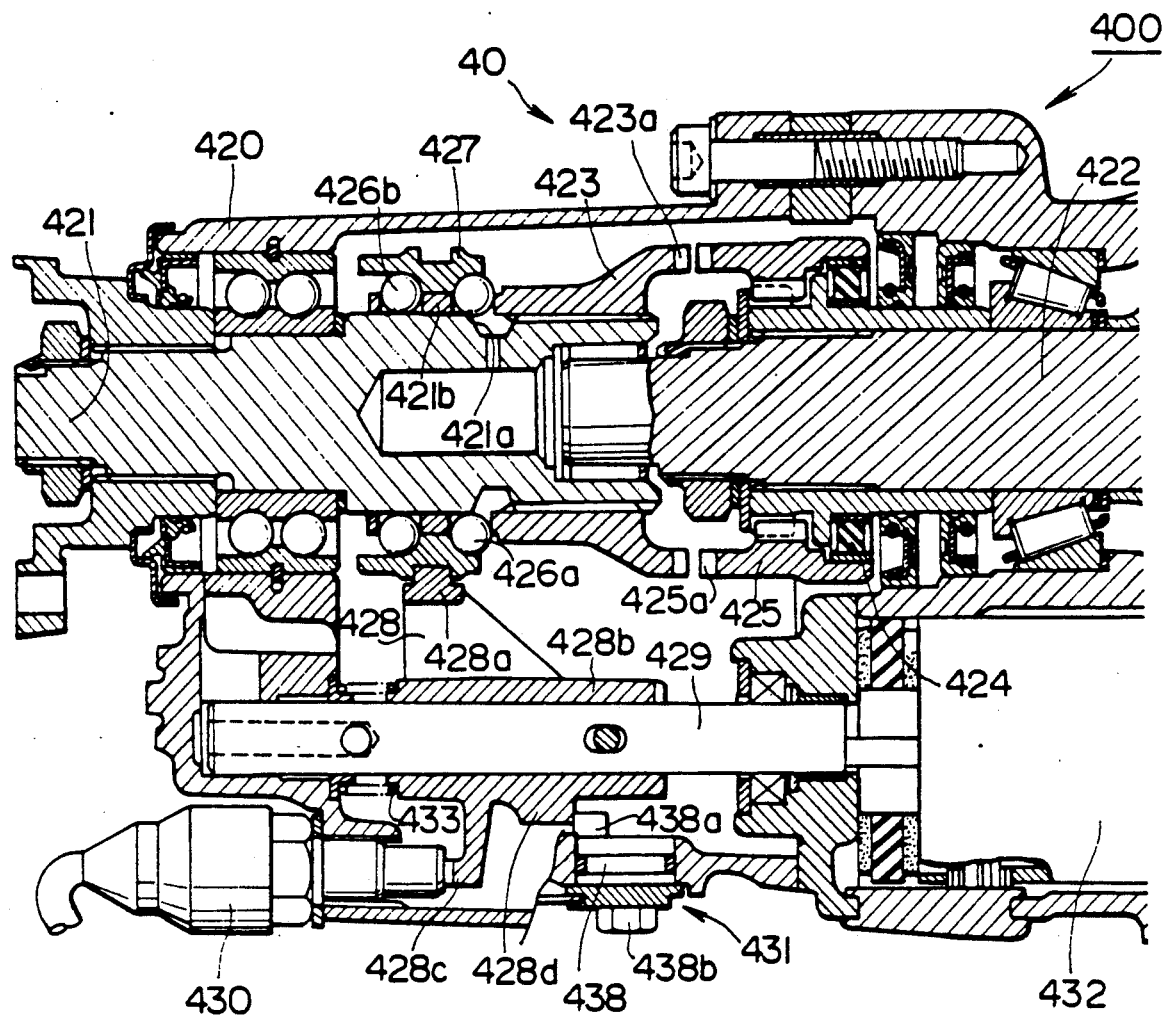
FIG. 32(a) is a longitudinal cross-sectional view of the dog clutch mechanism of the fourth embodiment as it is disengaged.
Figure 32B:
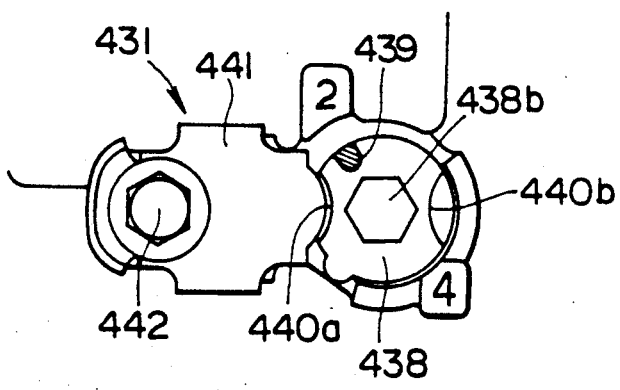
FIG. 32(b) is a plan view of a portion of the dog clutch mechanism shown in FIG. 32(a)
Figure 33:
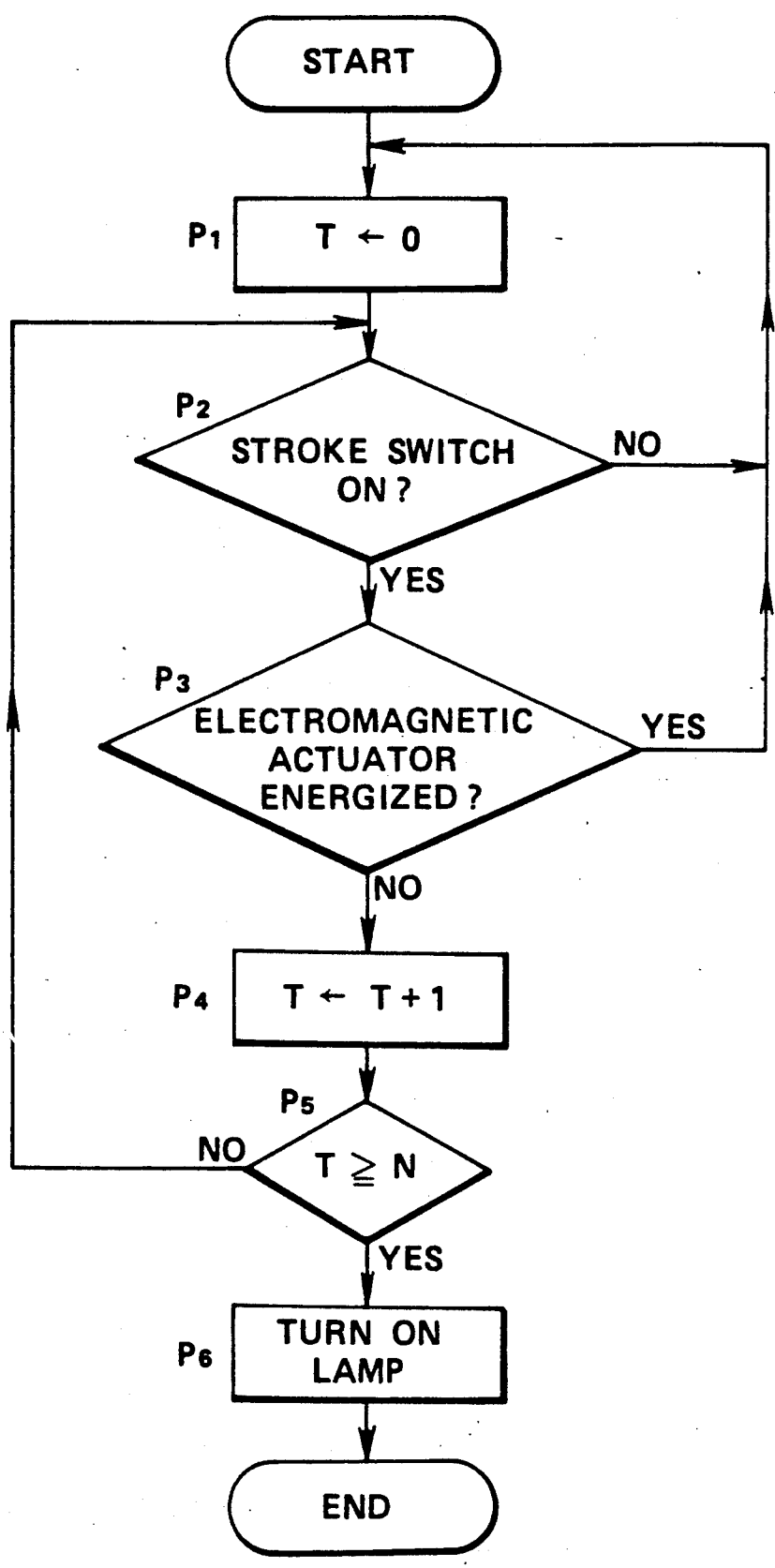
FIG. 33 is a flowchart of a control sequence for detecting engagement and disengagement of the dog clutch mechanism of the fourth embodiment which is incorporated in the four-wheel-drive vehicle shown in FIG. 30.

As shown in FIGS. 31(a), 31(b), 32(a), and 32(b) the manual switching mechanism 431 has a column 438 extending through and rotatably mounted on the clutch case 420, and a presser 438a is disposed off center on an end surface of the column 438 inside of the case 420 for engaging the raised portion 428d of the shift fork 428. A hexagonal operating element 438b is formed on the outer end face of the column 438 outside of the clutch case 420. The column 438 can be turned about its own axis by manually turning the operating element 438b with a wrench or the like for causing the presser 438a to press the raised portion 428d and hence the shift fork 428 to move the shift fork 428 into the position shown in FIG. 32(a), thus holding the dog clutch 40 in the disengaged position. The outer end face of the column 438 has, as shown in FIGS. 31(b) and 32(b), a colored mark 438 which can be brought into registry with marks "2", "4" impressed on an outer wall surface of the clutch case 420, and also has two diametrically opposite recesses 440a, 440b. Dependent on the angular position of the column 438, i.e., whether the dog clutch 40 is engaged or disengaged, the mark 439 is pointed at the mark "4" or "2". A holder plate 441 detachably mounted on the outer wall surface of the clutch case 420 by a bolt 442 has an end fitted in the recess 440a or 440b to keep the column 438 in a selected angular position.

With the column 438 of the manual switching mechanism 431 being in the position shown in FIGS. 31(a) and 31(b), when the solenoid of the electromagnetic actuator 432 is de-energized, the shift fork 428 is urged by the return spring 433 to cause the sleeve 428 to hold the balls 426a in the groove 421a, thus bringing the dog teeth 423a, 425a of the hub 423 and the dog piece 425 into mesh with each other thereby to engage the dog clutch 40. When the solenoid of the electromagnetic actuator 432 is energized, the shift fork 428 is axially pushed by the electromagnetic actuator 432 against the bias of the return spring 433 to displace the sleeve 427 and the shift fork 428, whereupon the balls 426a are moved out of the groove 421a and the dog teeth 423a, 425a are brought out of mesh with each other, thus disengaging the dog clutch 40. For keeping the dog clutch 40 disengaged in order to tow the vehicle or inspect the vehicle, the driver or operator turns the column 438 of the manual switching mechanism 431 with a wrench or other tool fitted over the operating element 438b, until the presser 438a presses the shift fork 428 to the leftmost position against the force of the spring 433, whereupon the column 438 is fixed in its angular position by the holder plate 441. The dog clutch 40 remains disengaged regardless of whether the electromagnetic actuator 432 is energized or not, thereby keeping the rear wheels 416R disconnected from the front wheels 416F and the engine 411. The vehicle can now easily be towed away or inspected.

While the four-wheel-drive vehicle is running under normal conditions, the sensors 435 detect the running conditions of the vehicle, and dependent on the detected running conditions, the controller 434 controls energization of the solenoid of the electromagnetic actuator 432 to automatically engage or disengage the dog clutch 40, i.e., switch between the two-wheel-drive and four-wheel-drive modes. The stroke switch 430 detects the operation (position) of the shift fork 428 as the operation (engagement or disengagement) of the dog clutch 40, and the controller 434 controls the electromagnetic actuator 432 through a feedback loop based on the detected signal from the stroke switch 430. The controller 434 determines whether the manual switching mechanism 431 is operated or not by ascertaining whether the output signal from the stroke switch 430 corresponds to energization or de-energization of the solenoid of the electromagnetic actuator 432. Such a determining process is carried out according to a control sequence shown in FIG. 33. A counter T serving as a timer is reset in a step $P_1$, which is followed by a step $P_2$, that determines whether the stroke switch 430 is turned on or not, i.e., the shift fork 428c engages the detecting element thereof or not. If the stroke switch 430 is not turned on, the step $P_1$ is executed again. If the stroke switch 430 is turned on, then a step $P_3$ determines whether the solenoid of the electromagnetic actuator 432 is energized or not. If the solenoid of the electromagnetic actuator 432 is energized, then control returns to the step $P_1$ to execute the step $P_1$ again. If the solenoid of the electromagnetic actuator 432 is not energized, then the count of the counter T is incremented by "1" in a step $P_4$. Then, a step $P_5$ determines whether or not the count of the counter T is equal to or higher than a preset value N. If the count of the counter T has not reached the preset value N, then control goes back to the step $P_2$. If the count of the counter T is equal to or higher than the preset value N, a lamp or other alarm is energized to let the driver know that the manual switching mechanism 431 is operated. Thus, if the stroke switch 430 continuously issues an ON signal for a prescribed period of time regardless of the fact that the solenoid of the electromagnetic actuator 432 is de-energized, the controller 434 determines that the dog clutch 40 is disengaged by the manual switching mechanism 431, and notifies the driver of such disengagement of the dog clutch 40 through a lamp or the like. The driver is therefore reminded of returning the manual switching mechanism 431 to its inactivated condition, and will not forget to inactivate the manual switching mechanism 431. The reliability of the dog clutch mechanism is increased since the above flowchart of control sequence also serves as a diagnostic process.

With the four-wheel-drive vehicle incorporating the dog clutch mechanism 400 of the fourth embodiment, the dog clutch is maintained in the disengaged condition by manually operating the manual switching mechanism which is of simple structure, and the operating condition of the manual switching mechanism is detected and indicated to the driver. Therefore, the vehicle can be towed or inspected while it is in the two-wheel-drive mode, and the driver or operator is prevented from forgetting to return the manual switching mechanism to the inactivated condition.

In the dog clutch mechanisms described above, except for the dog clutch mechanism of the third embodiment, when assembling the dog clutch, the shafts are inserted after the balls and the sleeve are put in place on the hub. At this time, it is necessary that the sleeve be retained in position so as not to allow the balls to be dislodged. According to a fifth embodiment of the present invention which will be described below, a sleeve can be positionally limited by a hub, not using a special fixture, so that balls are prevented from being dislodged when assembling a dog clutch mechanism.

The fifth embodiment of the present invention will hereinafter be described with reference to FIGS. 34 through 38.

A dog clutch mechanism 500 of the fifth embodiment generally includes an input shaft 501, an output shaft 506, and a dog clutch 50. The dog clutch 50 comprises a hub 511, balls 521, a sleeve 522, and a dog piece 531, all housed in a clutch case 561.

The input shaft 501 has a front portion to which a flange 502 is fixed by a nut 503 and has a recess 504 defined in a rear portion. The output shaft 506 has a front smaller-diameter portion 507 relatively rotatably disposed in the recess 504 through a bearing 508. The hub 511 is axially slidably fitted over the input shaft 501 through splines 512. The hub 511 is in the form of a tubular member comprising a front smaller-diameter portion 513, an intermediate larger-diameter portion 516 having an inner periphery on which the splines 512 are formed, and a rear larger-diameter portion having dog teeth 518, with a step 517 defined between the smaller-diameter portion 513 and the larger-diameter portion 516.

The smaller-diameter portion 513 has three front holes 514 spaced in equal circumferential intervals and three rear holes 515 spaced in equal circumferential intervals. Guide balls 519 are held in the front holes 514, and limiting balls 521 can be held in the rear holes 515. The sleeve 522 is held in sliding contact with outer peripheries of these balls 519, 521 and has a front longer larger-diameter portion 523, an intermediate annular land 524, and a rear shorter larger-diameter portion 525. The smaller-diameter portion 513 of the hub 511 has an outside diameter smaller than the inside diameter of the annular land 524, and the larger-diameter portion 516 of the hub 511 has an outside diameter greater than the inside diameter of the annular land 524.

A shift fork 527 has a distal end portion engaging in an annular groove 526 defined in the outer periphery of the sleeve 522, and a proximal portion coupled to a shift rod 545 by means of a pin 529.

The dog piece 531 comprises an outer piece 532 and an inner piece 536. The outer piece 532 has on a front end face thereof dog teeth 533 for meshing engagement with the dog teeth 518. The outer piece 532 is mounted on the inner piece 536 through splines 534 having circumferential gaps and a torsion damper 535. The inner piece 536 is fixedly mounted on the output shaft 506 through serrations 537 and a nut 509.

The dog teeth 518, 533 are tapered in shape so that they can produce thrust forces when they are in mesh with each other.

The sleeve 522 can be actuated by an actuator 541 comprising a solenoid in the fifth embodiment. The solenoid 541 has an armature 542, a harness 543, and a movable member or pusher pin 544 which is held against the rear end of the shift rod 545. The shift fork 527 is normally urged in a rearward direction by a return spring 546.

The output shaft 506 is rotatably assembled in a differential carrier 551 through bearings 552, 553 and a spring 554 therebetween, and oil seal members 555, 556 are disposed on the output shaft 506 in front of the bearings 552, 553 with an air chamber S defined between the oil seal members 555, 556. The solenoid 541 is disposed parallel to and below the output shaft 506. A harness cap 557 and a seal leakage detecting bolt 558 are attached to the lower surface of the differential carrier 551 below the solenoid 541.

The input shaft 501 is mounted in the clutch case 561 which is bolted to the front end of the differential carrier 551 through a spacer 559 therebetween, the input shaft 501 being rotatably supported by a rear bearing 562 and an oil seal 563. The shift rod 545 is disposed parallel to and below the input shaft 501. The shift rod 545 is guided by a front wall of the clutch case 561 and by the spacer 559 through an oil seal 564.

A manual operating element 565 is mounted on the lower surface of the clutch case 561 below the shift rod 545, the manual operating element 565 having a bolt head 566 and a projection 567 engaging the proximal end portion 528 of the shift fork 527. A stopper 568 for locking the manual operating element 565 in position is fastened to the clutch case 561 by a bolt 569 (see also FIG. 35). Rubber dampers 548, 549 are attached to the front and rear ends of the solenoid 541.

Figure 34:
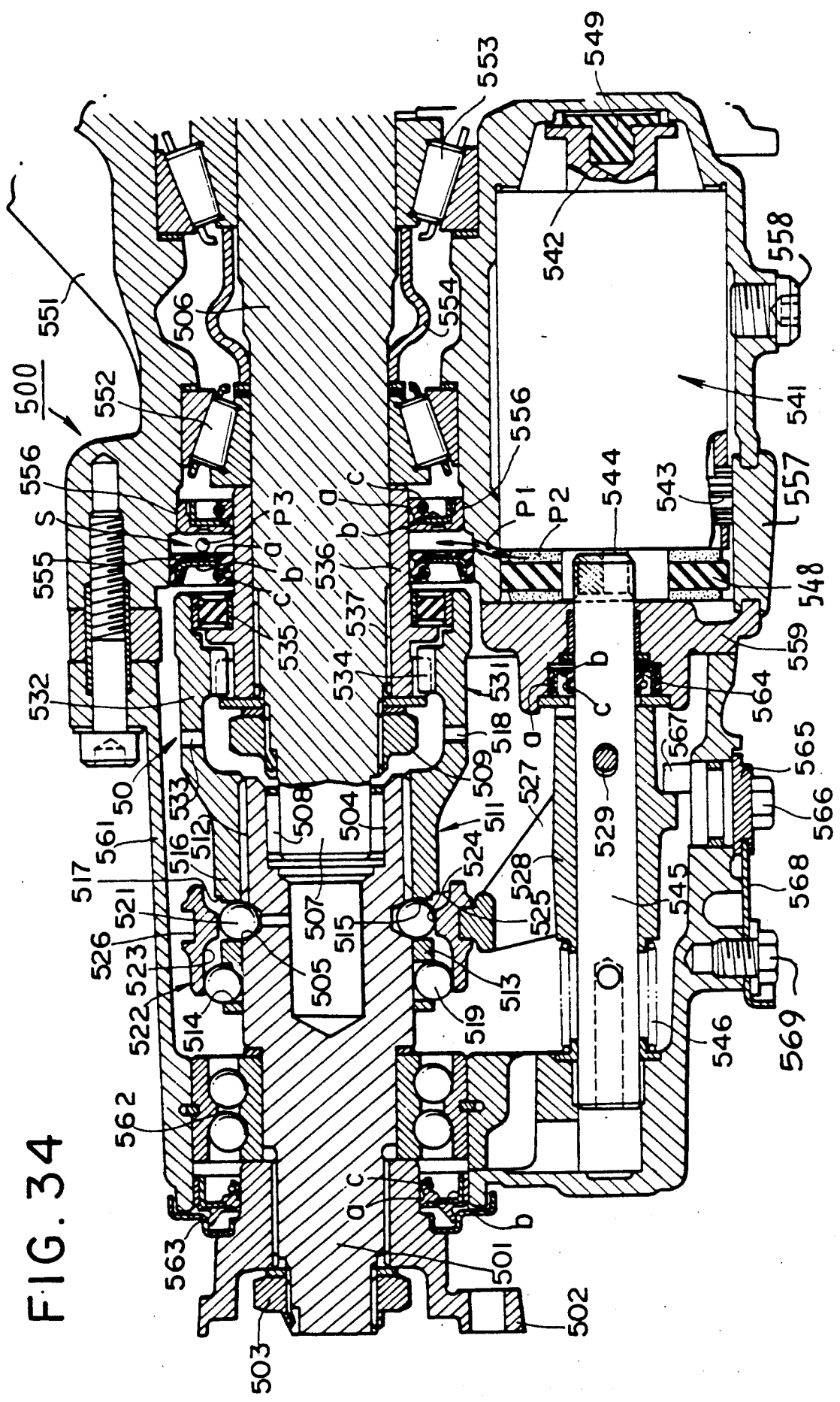
FIG. 34 is a longitudinal cross-sectional view of a dog clutch mechanism according to a fifth embodiment of the present invention.
Figure 35:
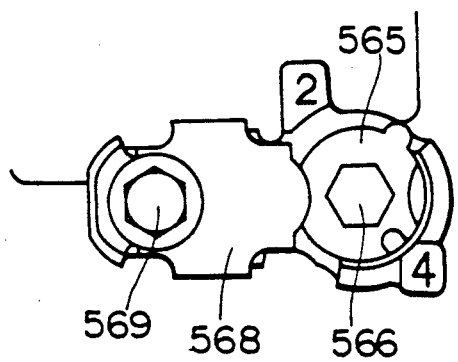
FIG. 35 is a plan view of a portion of the dog clutch mechanism of the fifth embodiment.

The dog clutch mechanism 500 thus constructed can be incorporated in the four-wheel-drive vehicle shown in FIG. 9 as with the first embodiment. The propeller shaft PS coupled to the engine E is connected to the input shaft 501 by the flange 502 (FIG. 34). The viscous fluid coupling RD which is the differential of the rear drive unit RDU is disposed in the differential carrier 551. Drive power is transmitted from the rear end of the output shaft 506 to the differential RD through a hypoid gear HPG.

Where a four-wheel anti-lock brake system is combined with the four-wheel-drive vehicle, the front and rear wheels are normally driven by engaging the dog clutch 50 as shown in FIG. 34. When the solenoid 541 is energized in response to operation of the four-wheel anti-lock brake system, the dog clutch 50 is disengaged to drive the vehicle in the two-wheel-drive mode. At this time, the movable member 544 of the solenoid 541 projects to cause the shift rod 545 and the shift fork 527 to move the sleeve 522 forwardly on the hub 511. Since thrust forces are produced between the dog piece 531 and the hub 511 due to meshing engagement of the dog teeth 518, 533, the dog teeth 518, 533 are quickly brought out of mesh with each other, and the hub 511 is moved in the forward direction under the thrust forces. The limiting balls 521 are now released from an annular groove 505 defined in the outer periphery of the input shaft 501.

While the torque is being transmitted, the input and output shafts 501, 506 can thus be connected to and disconnected from each other by a small operating force which is sufficient to move the sleeve 522.

When connecting the input and output shafts 501, 506 again, the solenoid 541 is de-energized to allow the shift fork 527 to move the sleeve 522 rearwardly on the hub 511 under the bias of the return spring 546. The annular land 524 of the sleeve 522 forces the limiting balls 521 into the annular groove 505 of the input shaft 501 to bring the dog teeth 518, 533 into mesh again with each other at an allowable speed of differential rotation between the input and output shafts 501, 506. At this time, any shock produced when connecting the input and output shafts 501, 506 again is reduced by the circumferential gaps of the splines 534 between the outer piece 532 and the inner piece 536 and the torsion damper 535.

When the solenoid 541 is de-energized, the vehicle is in the four-wheel-drive mode. For towing or inspecting the vehicle, the angular position of the operating element 565 on the lower surface of the clutch case 561 is manually changed and fixed by the stopper 546 to disengage the dog clutch 50 thus holding the vehicle in the two-wheel-drive mode.

A process of assembling the dog clutch 50 of the fifth embodiment will be described below.

First, the output shaft 506, the dog piece 531, the solenoid 541, the rear drive or differential unit (viscous fluid coupling) RDU, and other associated parts are assembled in the differential carrier 551. The differential carrier 551 is vertically placed with its front opening up.

Figure 36:
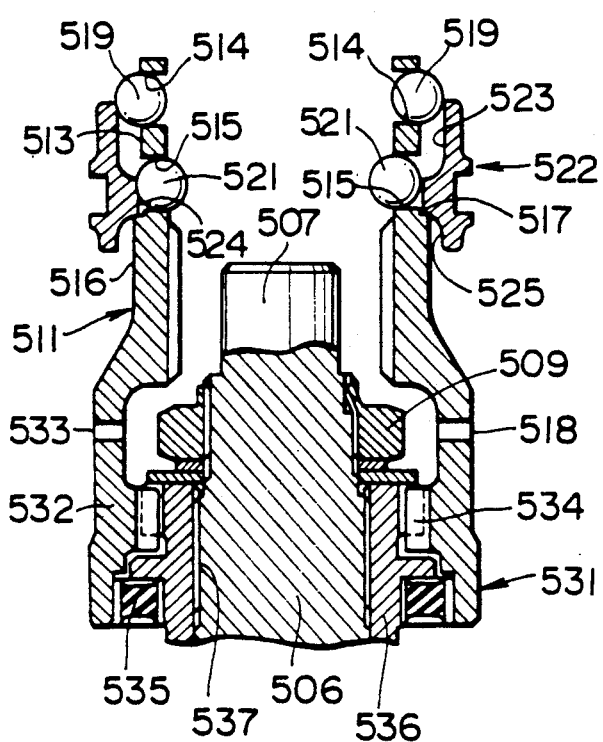
FIG. 36 is a fragmentary cross-sectional view showing the manner in which balls are assembled in the dog clutch mechanism of the fifth embodiment.
Figure 37:
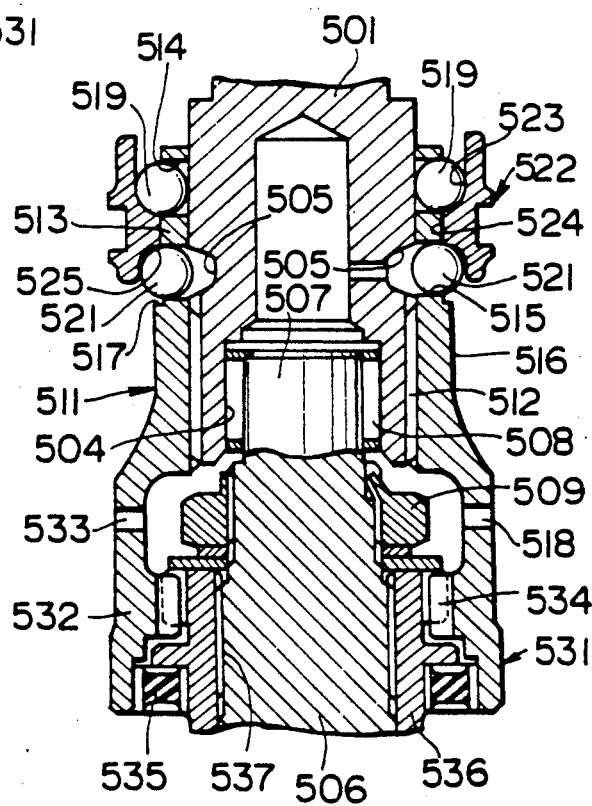
FIG. 37 is a fragmentary cross-sectional view showing the manner in which a shaft is assembled in the dog clutch mechanism of the fifth embodiment.

As shown in FIG. 36, the dog teeth 518 of the hub 511 positioned above are held in mesh with the dog teeth 533 of the dog piece 531, and then the sleeve 522 is fitted over the smaller-diameter portion 513 of the hub 511. The annular land 524 of the sleeve 522 is brought into abutment against the step 517 of the hub 511, whereupon the sleeve 522 is stopped with the annular land 524 overlapping the holes 515 in the hub 511. The limiting balls 521 can be prevented from being dislodged out of the holes 515 onto the outer periphery of the hub 511, and the guide balls 519 can also be prevented from dropping out of the holes 514 onto the outer periphery of the hub 511 by the larger-diameter portion 523 of the sleeve 522.

Grease is applied in the holes 514, 515, and the guide balls 519 and the limiting balls 521 are put into the respective holes 514, 515 from within the hub 511. The balls 519, 521 are prevented from falling out of the holes 514, 515 into the hub 511 by the applied grease layer.

Then, as shown in FIG, 37, the input shaft 501 is inserted into the hub 511, and slightly turned about its own axis while slightly lifting the sleeve 522 until the splines 512 are aligned in phase, whereupon the input shaft 501 drops due to gravity into coupling relation with the output shaft 506 through the bearing 508.

After the dog clutch 50 is thus assembled, the shift rod 545 is coupled to the sleeve 522 through the shift fork 527, and the clutch case 561 with various associated parts is mounted in place. The assembling procedure is now completed.

With the dog clutch mechanism of the fifth embodiment, as described above, since the sleeve 522 is positionally limited by abutment against the step 517 of the hub 511, the balls 521, 519 are prevented from being dislodged out of place without using any special fixture when assembling the dog clutch 50. When moving the sleeve 522 with the shift fork 527 to bring the dog teeth 533, 518 into mesh with each other, the shifting force from the shift fork 527 is transmitted through the balls 521 to the hub 511 to start moving the hub 511. When the balls 521 engage the annular groove 505, the dog teeth 533, 518 are completely in mesh with each other. After the balls 521 engage in the groove 505, the sleeve 522 abuts against the step 517 which presents further sliding movement. Therefore, the sleeve 522, the balls 521, and the smaller-diameter portion 513 of the hub 511 which holds the balls 521 jointly serve as a shift means for the dog teeth 518.

The differential carrier 551 and the clutch case 561 are provided with lubricating oils of different kinds. More specifically, since the vehicle is driven in the four-wheel-drive mode under normal conditions, the differential carrier 511 is provided with a lubricating oil similar to a transmission oil for use with the hypoid gear HPG which is coupled to the output shaft 506 and always held in mesh with the differential RD. The clutch case 561 is provided with a lubricating oil similar to grease for use on the dog teeth 533, 518, the shift rod 545, and the splines 512, 534 which are moved only when the drive modes are changed.

Figure 38:
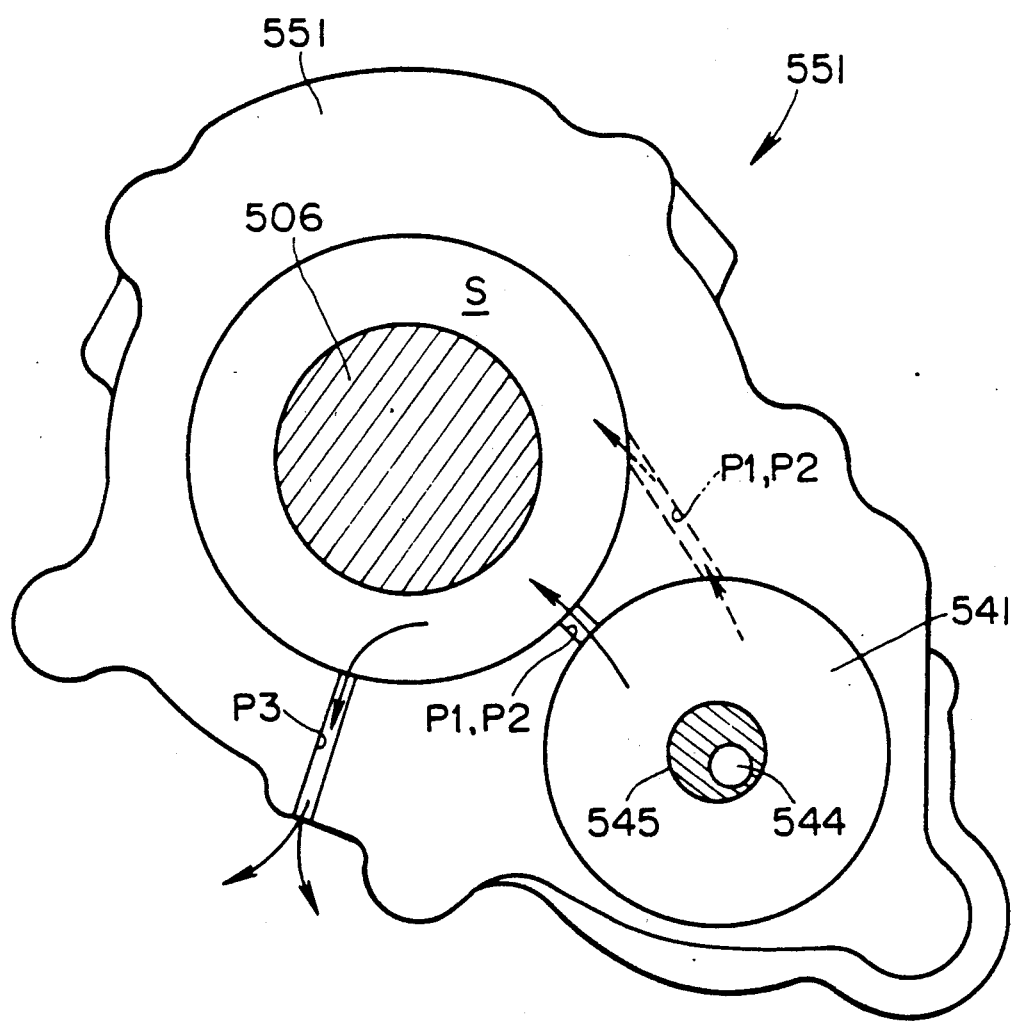
FIG. 38 is a schematic view showing an air bleeder passage in the dog clutch mechanism according to the fifth embodiment.

The spaces in which the oils are retained are divided from each other by the seal members 555, 556. The annular air chamber S as shown in FIG. 38 is defined between the backs of the seal members 555, 556. The solenoid 541 is disposed in a closed chamber defined obliquely downwardly of the air chamber S. The thick annular rubber damper 548 disposed between the front surface of the solenoid 541 and the spacer 559 has radial passages P1 defined in front and rear surfaces thereof. Each of the seal members 555, 556 and the seal members 563, 564 comprises a rubber seal member a, a metal plate b joined to the rubber seal member a to retain the radially outer profile thereof, and a spring c for normally urging the rubber seal member a radially inwardly.

The air chamber S is connected to air bleeder passages P2 communicating with the chamber housing the solenoid 541 through the passages P1, and another air bleeder passage P3 vented to atmosphere. As shown in FIG. 38, the air bleeder passages P2 join the air chamber S and the solenoid chamber through the minimum distance and are connected to the passages P1 of the rubber damper 548. The air bleeder passage P3 opens into the air chamber S at its lower portion.

When switching between the two-wheel-drive mode and the four-wheel-drive mode, the pusher pin 544 of the solenoid 541 is moved back and forth to move the shift rod 545 axially, resulting in a change in the volume of air within the annular rubber damper 548 as indicated by a hatched area. The change in the volume of air is compensated for by movement of air, i.e., breathing, through the passage P2, the air bleeder passages P1, the air chamber S, and the air bleeder passage P3.

Since the air bleeder passage P3 opens into the air chamber at its lower portion, dust, muddy water, and other foreign matter can easily be discharged from the air chamber S through the air bleeder passage P3. Inasmuch as the air bleeder passages P1 between the air chamber S and the solenoid chamber are spaced from the air bleeder passage P3 and are oriented in a different direction from the air bleeder passage P3, foreign matter is prevented from entering the solenoid chamber because of a labyrinthine passage system.

As indicated by the dotted lines in FIG. 38, the air bleeder passage P1 between the air chamber S and the solenoid chamber is defined in a higher position for more effective prevention of entry of foreign matter into the solenoid chamber.

If the air chamber S between the seal members 555, 556 were closed, a negative pressure would be developed due to changes in the temperatures of the front and rear oil chambers, thus affecting the sealing ability of the seal members 555, 556. This drawback is eliminated because the air chamber S is connected to the air bleeder passage P3 vented to atmosphere. Oil leakage from the passage P3 can be detected as indicating a sealing failure of the seal members 555, 556.

When oil leaks from the bolt 558 on the lower surface of the differential carrier 551 below the solenoid 541, a sealing failure of the seal member 564 can also be detected.

The chamber in clutch case 561 which houses the dog clutch serves as a first chamber, the chamber containing solenoid 541 as a second chamber and the chamber in the differential carrier as a third chamber.

In the fifth embodiment, the dog clutch mechanism is employed as a power transmission switching device on the rear differential, it may be used with the front differential. The switching device is not limited to a dog clutch, but may be of any desired structure.

With the dog clutch mechanism 500 of the fifth embodiment, as described above, since the closed chamber housing the electromagnetic actuator is vented to atmosphere through the air chamber between the seal members via the air bleeder passage P3 defined in the differential carrier or housing. When the movable member of the actuator is moved back and forth, air is bled from the actuator chamber via the air chamber between the sea members into the atmosphere, so that resistance to the movement of the actuator is reduced.

Since the volume of the chambers including the air chamber between the seal members, in which a change in the volume of air due to movement of the movable member of the actuator is caused, is larger than would be if the actuator chamber were directly vented to atmosphere, the proportion of the change in the volume of air to the total combined chamber volume is very small, and air resistance to movement of the actuator is greatly reduced.

Moreover, because the actuator chamber is vented to atmosphere through the air chamber between the seal members, dust or other foreign matter is prevented from entering the actuator chamber.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A dog clutch mechanism for switching drive power in a four-wheel-drive vehicle having front and rear wheels, comprising:

a case;

first and second rotatable shaft rotatably supported coaxially in said case for transmitting a relative torque between the front and rear wheels;

dog clutch means comprising a dog piece having first dog teeth and fixedly mounted on said first rotatable shaft and a hub having second dog teeth capable of axially meshing with said first dog teeth and axially slidably mounted on said second rotatable shaft, said dog clutch means being selectively engageable for transmitting the relative torque between said first and second rotatable shafts;

said first and second dog teeth having respective meshing tapered surfaces for producing thrust forces acting on said hub and tending to move said hub in a direction away from said dog piece when the vehicle is braked while a relative forward torque is being transmitted between said first and second rotatable shafts through said dog clutch means, the tapered surfaces of each dog tooth being of opposite inclination with different angles of taper, one of said tapered surfaces being engaged during transmission of driving torque through said dog clutch means while the other of the tapered surfaces is engaged during braking, said one tapered surface having a smaller taper than said other tapered surface so that greater thrust force will be applied during braking to disengage the dog clutch means, said hub comprising a first tubular portion, spline means axially slidably mounting said first tubular portion on said second rotatable shaft, said dog clutch mechanism further including:

shift means for moving said first and second dog teeth into and out of mesh with each other, said hub further comprising a second tubular portion slidably disposed on said second rotatable shaft, smaller in outside diameter than said first tubular portion, a step connecting said first and second tubular portions together, said shift means comprising a tubular engaging member slidably disposed around said second tubular portion and engageable with said step to be prevented from undergoing sliding movement at least when said first and second dog teeth mesh with each other, said shift means comprising spring means for urging said first and second dog teeth into mesh with one another, and electromagnetic actuator means for producing a force to overcome the spring means so that the first and second dog teeth can become disengaged under the thrust force acting therebetween.

2. A dog clutch mechanism for switching drive power in a four-wheel-drive vehicle having front and rear wheels, comprising:

a case;

first and second rotatable shafts rotatably supported coaxially in said case for transmitting a relative torque between the front and rear wheels;

dog clutch means comprising a dog piece having first dog teeth and fixedly mounted on said first rotatable shaft and a hub having second dog teeth capable of axially meshing with said first dog teeth and axially slidably mounted on said second rotatable shaft, said dog clutch means being selectively engageable for transmitting the relative torque between said first and second rotatable shafts;

said first and second dog teeth having respective meshing tapered surfaces for producing thrust forces acting on said hub and tending to move said hub in a direction away from said dog piece when the vehicle is braked while a relative forward torque is being transmitted between said first and second rotatable shafts through said dog clutch means, the tapered surfaces of each dog tooth being of opposite inclination with different angles of taper, one of said tapered surfaces being engaged during transmission of driving torque through said dog clutch means while the other of the tapered surfaces is engaged during braking, said one tapered surface having a smaller taper than said other tapered surface so that greater thrust force will be applied during braking to disengage the dog clutch means, said hub comprising a tubular portion axially slidably mounted on said second rotatable shaft;

shift means for moving said first and second dog teeth into and out of mesh with each other, said shift means comprising a tubular engaging member slidably disposed around said tubular portion of said hub, balls disposed in holes defined in said tubular portion and extending towards said second rotatable shaft, said balls being movable by said tubular engaging member into an annular groove defined in said second rotatable shaft when said first and second dog teeth mesh with each other.

3. A dog clutch mechanism according to claim 2, further comprising clutch engagement checking means for preventing said first and second rotatable shafts from being connected through said dog clutch means when a speed of differential rotation between said first and second rotatable shafts is higher than a predetermined value.

4. A dog clutch mechanism according to claim 3, wherein said clutch engagement checking means comprises:

a torsion bar having one end coupled to said second rotatable shaft and extending in an axial direction; and viscous coupling means disposed between the other end of said torsion bar and said first rotatable shaft for rotating said other end of said torsion bar dependent on said speed of differential rotation.

5. A dog clutch mechanism according to claim 4, wherein said viscous coupling means comprises:

an axial end of said first rotatable shaft defining a cylinder bore therein which extends axially from an end of said second rotatable shaft;

a piston coaxially disposed in said cylinder bore with a highly viscous fluid therebetween; and an engagement checking cam piece gripping said other end of the torsion bar for rotation therewith and integrally formed with said piston.

6. A dog clutch mechanism according to claim 5, wherein said second rotatable shaft has an axial end having defined therein a cylindrical hole housing said torsion bar an said cam piece therein and having a bottom to which said one end of the torsion bar is coupled, said cylindrical hole extending axially from said first rotatable shaft, and a guide hole extending radially into said cylindrical hole toward a cam surface of said cam piece, said tubular portion of said hub having an inner peripheral sliding surface axially slidably movable on said second rotatable shaft when said second dog teeth are moved into and out of mesh with said first dog teeth, and an annular groove defined in said inner peripheral sliding surface, said clutch engagement checking means further including an engagement checking ball disposed in said guide hole and movable into said annular groove upon being pushed by said cam surface of the cam piece which is rotated when the speed of differential rotation is higher than said predetermined value, for preventing said hub from being axially moved to bring said first and second dog teeth into mesh with each other.

7. A dog clutch mechanism according to claim 2, wherein said dog piece comprises a tubular member fixed to said first rotatable shaft and on which said first dog teeth are formed, said tubular portion of said hub having an inner peripheral sliding surface axially slidably movable on said second rotatable shaft when said second dog teeth are moved into and out of mesh with said first dog teeth, said dog clutch mechanism further comprising:

sliding movement limiting means disposed between an outer periphery of said dog piece and said inner peripheral sliding surface of the tubular portion of the hub for limiting axial sliding movement of said hub toward said dog piece with a limiting force which increases in proportion to the speed of differential rotation between said dog piece and said hub and for allowing said hub to axially slide when said speed of differential rotation is lower than a predetermined value, when said first and second rotatable shafts are to be connected to each other by said dog clutch means.

8. A dog clutch mechanism according to claim 7, wherein said sliding movement limiting means includes at least a tubular blocking member disposed coaxially around said dog piece with a highly viscous fluid therebetween, providing a viscous coupling mechanism, for blocking axial sliding movement of said hub.

9. A dog clutch mechanism according to claim 8, wherein said sliding movement limiting means further includes engaging members disposed on an outer periphery of said tubular blocking member and engaged members disposed on said inner peripheral sliding surface of said hub for engaging said engaging member before said first and said second dog teeth mesh with each other, the arrangement being such that when said hub is axially slid to bring said first and second dog teeth into mesh with each other, said engaging and engaged members are first brought into engagement with each other to allow said hub and said tubular blocking member to rotate in unison with each other, and when the speed of differential rotation between said tubular blocking member and said hub is lower than said predetermined value, said engaging and engaged members are brought out of engagement with each other to allow said hub to axially slide for meshing engagement between said first and second dog teeth.

10. A dog clutch mechanism for switching drive power in a four-wheel-drive vehicle having front and rear wheels, comprising:

a case;

first and second rotatable shafts rotatably supported coaxially in said case for transmitting a relative torque between the front and rear wheels;

dog clutch means comprising a dog piece having first dog teeth and fixedly mounted on said first rotatable shaft and a hub having second dog teeth capable of axially meshing with said first dog teeth and axially slidably mounted on said second rotatable shaft, said dog clutch means being selectively engageable for transmitting the relative torque between said first and second rotatable shafts;

said first and second dog teeth having respective meshing tapered surfaces for producing thrust forces acting on said hub and tending to move said hub in a direction away from said dog piece when the vehicle is braked while a relative forward torque is being transmitted between said first and second rotatable shafts through said dog clutch means, the tapered surfaces of each dog tooth being of opposite inclination with different angles of taper, one of said tapered surfaces being engaged during transmission of driving torque through said dog clutch means while the other of the tapered surfaces is engaged during braking, said one tapered surface having a smaller taper than said other tapered surface so that greater thrust force will be applied during braking to disengage the dog clutch means, an electromagnetic actuator having a movable member for actuating said dog clutch means, and a power transmitting mechanism disposed adjacent to said first rotatable shaft for receiving the transmitted torque; and said case having a first chamber housing said dog clutch means and defined by at least on oil seal member, a second chamber housing said electromagnetic actuator and defined and closed by at least a seal member, a third chamber housing said power transmitting mechanism and defined by at least an oil seal member, and an air passage means defined by at least said oil seal members and said seal member and communicating with said second chamber through a communication hole for venting said second chamber to atmosphere.

* * * * *